US009864957B2

(12) United States Patent
Rennie et al.

(10) Patent No.: US 9,864,957 B2
(45) Date of Patent: *Jan. 9, 2018

(54) INFORMATION DELIVERY AND MAINTENANCE SYSTEM FOR DYNAMICALLY GENERATED AND UPDATED DATA PERTAINING TO ROAD MAINTENANCE VEHICLES AND OTHER RELATED INFORMATION

(71) Applicant: CONCATEN, INC., Golden, CA (US)

(72) Inventors: Christopher J. Rennie, Seattle, WA (US); Kevin K. Groeneweg, Golden, CO (US)

(73) Assignee: Concaten, Inc., Golden, CO (US)

( * ) Notice: Subject to any disclaimer, the term of this patent is extended or adjusted under 35 U.S.C. 154(b) by 649 days.

This patent is subject to a terminal disclaimer.

(21) Appl. No.: 14/051,007

(22) Filed: Oct. 10, 2013

(65) Prior Publication Data

US 2015/0106299 A1   Apr. 16, 2015

Related U.S. Application Data

(63) Continuation of application No. 13/560,797, filed on Jul. 27, 2012, now Pat. No. 8,583,333, which is a
(Continued)

(51) Int. Cl.
*G06F 7/00* (2006.01)
*G06Q 10/00* (2012.01)
*G06Q 50/10* (2012.01)

(52) U.S. Cl.
CPC .............. *G06Q 10/00* (2013.01); *G06Q 50/10* (2013.01)

(58) Field of Classification Search
CPC .............................. G06Q 10/00; G06Q 50/10
See application file for complete search history.

(56) References Cited

U.S. PATENT DOCUMENTS 3,160,964 A   12/1964 Boyer et al.
3,344,993 A   10/1967 Wilder et al.
(Continued)

FOREIGN PATENT DOCUMENTS

CA   2060418   5/1994
CA   2233689   4/1997
(Continued)

OTHER PUBLICATIONS

Request for Inter Partes Reexamination of U.S. Pat. No. 7,714,705, assigned control No. 95/001,629.
(Continued)

*Primary Examiner* — Kim T Nguyen
(74) *Attorney, Agent, or Firm* — Carl A. Hjort, III

(57) ABSTRACT

Selected types of information are collected from various sources and a portion thereof transmitted to a remote server. The remote server dynamically compiles and processes this data with information from other similar and separate sources and provides useful and relevant information, such as vehicle and location specific road maintenance radar, forecasts and treatment recommendations, and then transmits the data back to the vehicles in the field for one or more of the appropriate deployment of equipment, instructions and the automated or manual application of materials.

20 Claims, 11 Drawing Sheets

Related U.S. Application Data continuation of application No. 12/147,837, filed on Jun. 27, 2008, now Pat. No. 8,275,522.

(60) Provisional application No. 60/947,257, filed on Jun. 29, 2007.

(56) References Cited

U.S. PATENT DOCUMENTS

| | | |
|---|---|---|
| 3,420,451 A | 1/1969 | Kahlbacher |
| 3,459,375 A | 8/1969 | Goffin |
| 3,519,169 A | 7/1970 | Holland |
| 3,540,655 A | 11/1970 | Hinrichs |
| 3,559,894 A | 2/1971 | Murray et al. |
| 3,655,130 A | 4/1972 | Patrick |
| 3,776,421 A | 12/1973 | Harrison et al. |
| 3,776,431 A | 12/1973 | Riley |
| 3,856,206 A | 12/1974 | Bell et al. |
| 3,891,979 A | 6/1975 | Braun et al. |
| 3,995,569 A | 12/1976 | Picardat |
| 4,052,003 A | 10/1977 | Steffen |
| 4,077,139 A | 3/1978 | Fagervold et al. |
| 4,084,748 A | 4/1978 | Anderson et al. |
| 4,176,791 A | 12/1979 | Cattaneo et al. |
| 4,209,065 A | 6/1980 | Ledent |
| 4,210,284 A | 7/1980 | Tarnay et al. |
| 4,230,280 A | 10/1980 | Leigh et al. |
| 4,234,109 A | 11/1980 | Goodhart |
| 4,260,107 A | 4/1981 | Jackson |
| 4,274,091 A | 6/1981 | Decker |
| 4,274,901 A | 6/1981 | Elber |
| 4,373,668 A | 2/1983 | Forbes et al. |
| 4,376,007 A | 3/1983 | Eigenmann |
| 4,391,393 A | 7/1983 | Filmyer |
| 4,422,562 A | 12/1983 | Rawson |
| 4,442,979 A | 4/1984 | Kupper |
| 4,473,319 A | 9/1984 | Spangler |
| 4,491,275 A | 1/1985 | Holsworth |
| 4,492,952 A | 1/1985 | Miller |
| 4,503,806 A | 3/1985 | Prusak et al. |
| 4,523,280 A | 6/1985 | Bachman |
| 4,529,336 A | 7/1985 | Shinozaki et al. |
| 4,553,702 A | 11/1985 | Coffee et al. |
| 4,577,781 A | 3/1986 | Braun |
| 4,588,127 A | 5/1986 | Ehrat |
| 4,678,056 A | 7/1987 | Kobari et al. |
| 4,684,062 A | 8/1987 | Bagwell |
| 4,690,553 A | 9/1987 | Fukamizu et al. |
| 4,700,223 A | 10/1987 | Shoutaro et al. |
| 4,700,895 A | 10/1987 | Takata |
| 4,733,760 A | 3/1988 | Inagaki et al. |
| 4,768,716 A | 9/1988 | Buchanan, Jr. et al. |
| 4,803,626 A | 2/1989 | Bachman et al. |
| 4,805,088 A | 2/1989 | Cross et al. |
| 4,809,197 A | 2/1989 | Tashiro et al. |
| 4,829,434 A | 5/1989 | Karmel et al. |
| 4,829,684 A | 5/1989 | Gruber |
| 4,881,371 A | 11/1989 | Haeder et al. |
| 4,898,333 A | 2/1990 | Kime et al. |
| 4,955,538 A | 9/1990 | Laube et al. |
| 4,984,163 A | 1/1991 | Kuwana et al. |
| 5,012,977 A | 5/1991 | Karklins et al. |
| 5,028,017 A | 7/1991 | Simmons et al. |
| 5,069,392 A | 12/1991 | Wise et al. |
| 5,096,125 A | 3/1992 | Wise et al. |
| 5,177,685 A | 1/1993 | Davis et al. |
| 5,186,396 A | 2/1993 | Wise et al. |
| 5,267,696 A | 12/1993 | Balmer |
| 5,310,113 A | 5/1994 | Cowgur |
| 5,318,226 A | 6/1994 | Kime et al. |
| 5,331,331 A | 7/1994 | Wu |
| 5,334,987 A | 8/1994 | Teach |
| 5,343,744 A | 9/1994 | Ammann |
| 5,366,039 A | 11/1994 | Sawada |
| 5,386,727 A | 2/1995 | Searle |
| 5,416,475 A | 5/1995 | Tolbert et al. |
| 5,416,476 A | 5/1995 | Rendon |
| 5,439,312 A | 8/1995 | Marcato |
| 5,447,272 A | 9/1995 | Ask |
| 5,449,049 A | 9/1995 | Every |
| 5,452,966 A | 9/1995 | Swisher, Jr. |
| RE35,100 E | 11/1995 | Monson et al. |
| 5,469,371 A | 11/1995 | Bass |
| 5,515,043 A | 5/1996 | Berard et al. |
| 5,515,623 A | 5/1996 | Weeks |
| 5,521,594 A | 5/1996 | Fukushima |
| 5,603,452 A | 2/1997 | Hester |
| 5,606,307 A | 2/1997 | Kuan |
| 5,619,193 A | 4/1997 | Doherty et al. |
| 5,652,522 A | 7/1997 | Kates et al. |
| 5,653,389 A | 8/1997 | Henderson et al. |
| 5,684,476 A | 11/1997 | Anderson |
| 5,699,056 A | 12/1997 | Yoshida |
| 5,717,737 A | 2/1998 | Doviak et al. |
| 5,745,051 A | 4/1998 | Doherty et al. |
| 5,746,539 A | 5/1998 | Mara |
| 5,774,070 A | 6/1998 | Rendon |
| 5,794,172 A | 8/1998 | Matheson et al. |
| 5,796,344 A | 8/1998 | Mann et al. |
| 5,818,339 A | 10/1998 | Giles et al. |
| 5,844,473 A | 12/1998 | Kaman |
| 5,904,296 A | 5/1999 | Doherty et al. |
| 5,928,504 A | 7/1999 | Hembre et al. |
| 5,931,393 A | 8/1999 | Alsip et al. |
| 5,931,882 A | 8/1999 | Fick et al. |
| 5,947,391 A | 9/1999 | Beck et al. |
| 5,947,931 A | 9/1999 | Bierman |
| 5,952,565 A | 9/1999 | Huber et al. |
| 5,955,973 A | 9/1999 | Anderson |
| 5,956,664 A | 9/1999 | Bryan |
| 5,957,621 A | 9/1999 | Clark, Jr. et al. |
| 5,982,325 A | 11/1999 | Thornton et al. |
| 6,012,012 A | 1/2000 | Fleck et al. |
| 6,029,111 A | 2/2000 | Croyle |
| 6,064,970 A | 5/2000 | McMillan et al. |
| 6,089,743 A | 7/2000 | McQuinn |
| 6,092,745 A | 7/2000 | Seymour et al. |
| 6,131,136 A | 10/2000 | Liebenow et al. |
| 6,166,627 A | 12/2000 | Reeley |
| 6,166,657 A | 12/2000 | Mann |
| 6,173,904 B1 | 1/2001 | Doherty et al. |
| 6,198,920 B1 | 3/2001 | Doviak et al. |
| 6,236,365 B1 | 5/2001 | LeBlanc et al. |
| 6,236,907 B1 | 5/2001 | Hauwiller et al. |
| 6,236,933 B1 | 5/2001 | Lang |
| 6,246,938 B1 | 6/2001 | Giletta et al. |
| 6,253,129 B1 | 6/2001 | Jenkins et al. |
| 6,317,684 B1 | 11/2001 | Roeseler et al. |
| 6,330,499 B1 | 12/2001 | Chou et al. |
| 6,354,786 B1 | 3/2002 | Feller |
| 6,356,823 B1 | 3/2002 | Iannotti et al. |
| 6,377,881 B1 | 4/2002 | Mullins |
| 6,384,739 B1 | 5/2002 | Roberts |
| 6,418,324 B1 | 7/2002 | Doviak et al. |
| 6,429,773 B1 | 8/2002 | Schuyler |
| 6,429,812 B1 | 8/2002 | Hoffberg |
| 6,470,272 B2 | 10/2002 | Cong et al. |
| 6,472,982 B2 | 10/2002 | Eida et al. |
| 6,497,368 B1 | 12/2002 | Friend et al. |
| 6,535,141 B1 | 3/2003 | Doherty |
| 6,538,578 B1 | 3/2003 | Doherty |
| 6,546,425 B1 | 4/2003 | Hanson et al. |
| 6,556,899 B1 | 4/2003 | Harvey et al. |
| 6,567,035 B1 | 5/2003 | Elliott |
| 6,587,785 B2 | 7/2003 | Jijina et al. |
| 6,611,739 B1 | 8/2003 | Harvey et al. |
| 6,611,740 B2 | 8/2003 | Lowry et al. |
| 6,631,322 B1 | 10/2003 | Arthur et al. |
| 6,640,187 B1 | 10/2003 | Chenault et al. |
| 6,647,270 B1 | 11/2003 | Himmelstein |
| 6,650,252 B2 | 11/2003 | Miller, Jr. |
| 6,700,493 B1 | 3/2004 | Robinson |
| 6,714,857 B2 | 3/2004 | Kapolka et al. |
| 6,738,697 B2 | 5/2004 | Breed |
| 6,745,153 B2 | 6/2004 | White et al. |

(56) References Cited

U.S. PATENT DOCUMENTS

| | | |
|---|---|---|
| 6,732,032 B1 | 8/2004 | Kondow et al. |
| 6,791,456 B2 | 9/2004 | Nakayama et al. |
| 6,791,472 B1 | 9/2004 | Hoffberg |
| 6,799,097 B2 | 9/2004 | Villarreal et al. |
| 6,801,837 B2 | 10/2004 | Carlstedt et al. |
| 6,804,602 B2 | 10/2004 | Impson et al. |
| 6,826,405 B2 | 11/2004 | Doviak et al. |
| 6,840,098 B2 | 1/2005 | Halliday |
| 6,885,874 B2 | 4/2005 | Grube et al. |
| 6,919,821 B1 | 7/2005 | Smith |
| 6,938,829 B2 | 9/2005 | Doherty et al. |
| 6,950,013 B2 | 9/2005 | Scaman et al. |
| 6,950,022 B2 | 9/2005 | Breed |
| 6,952,181 B2 | 10/2005 | Karr et al. |
| 6,977,597 B2 | 12/2005 | Doherty |
| 6,981,047 B2 | 12/2005 | Hanson et al. |
| 6,988,033 B1 | 1/2006 | Lowry et al. |
| 7,027,915 B2 | 4/2006 | Craine |
| 7,064,657 B2 | 6/2006 | Becker et al. |
| 7,084,775 B1 | 8/2006 | Smith |
| 7,085,382 B2 | 8/2006 | Terao et al. |
| 7,117,075 B1 | 10/2006 | Larschan et al. |
| 7,138,916 B2 | 11/2006 | Schwartz et al. |
| 7,164,365 B2 | 1/2007 | Doherty et al. |
| 7,248,159 B2 | 7/2007 | Smith |
| 7,268,703 B1 | 9/2007 | Kabel et al. |
| 7,355,509 B2 | 4/2008 | Rennie et al. |
| 7,386,392 B1 | 6/2008 | Kabel et al. |
| 7,392,117 B1 | 6/2008 | Bilodeau et al. |
| 7,400,267 B1 | 7/2008 | Doherty et al. |
| 7,421,334 B2 | 9/2008 | Dahlgren et al. |
| 8,583,333 B2 * | 11/2013 | Rennie .............. G06Q 10/06 701/50 |
| 2001/0045891 A1 | 11/2001 | Nakao et al. |
| 2002/0122394 A1 | 9/2002 | Whitmore et al. |
| 2002/0128770 A1 * | 9/2002 | Ooishi .............. G01C 21/26 701/516 |
| 2002/0193938 A1 | 12/2002 | DeKock et al. |
| 2003/0040944 A1 * | 2/2003 | Hileman ............ G06Q 10/02 705/5 |
| 2003/0058216 A1 | 3/2003 | Lacroix et al. |
| 2003/0125073 A1 | 7/2003 | Tsai et al. |
| 2004/0105608 A1 | 6/2004 | Sloman |
| 2004/0138790 A1 | 7/2004 | Kapolka et al. |
| 2004/0170181 A1 | 9/2004 | Bogdon et al. |
| 2004/0195357 A1 | 10/2004 | Doherty et al. |
| 2004/0203436 A1 | 10/2004 | Oesterling |
| 2004/0224668 A1 | 11/2004 | Shell et al. |
| 2004/0264402 A9 | 12/2004 | Whitmore et al. |
| 2005/0002419 A1 | 1/2005 | Doviak et al. |
| 2005/0020308 A1 | 1/2005 | Lai |
| 2005/0043019 A1 | 2/2005 | Nakamura et al. |
| 2005/0066033 A1 | 3/2005 | Cheston et al. |
| 2005/0192725 A1 | 9/2005 | Li |
| 2005/0198257 A1 | 9/2005 | Gupta et al. |
| 2005/0203683 A1 | 9/2005 | Olsen et al. |
| 2005/0223114 A1 | 10/2005 | Hanson et al. |
| 2005/0223115 A1 | 10/2005 | Hanson et al. |
| 2005/0243857 A1 | 11/2005 | Hofstaedter et al. |
| 2005/0246088 A1 | 11/2005 | Doherty et al. |
| 2006/0009213 A1 | 1/2006 | Sturniolo et al. |
| 2006/0022846 A1 | 2/2006 | Tummala |
| 2006/0023676 A1 | 2/2006 | Whitmore et al. |
| 2006/0046716 A1 | 3/2006 | Hofstaedter |
| 2007/0219682 A1 | 9/2007 | Kumar et al. |
| 2007/0265780 A1 | 11/2007 | Kesler et al. |
| 2007/0296574 A1 | 12/2007 | Smith et al. |
| 2008/0033605 A1 | 2/2008 | Daum et al. |
| 2008/0157943 A1 | 7/2008 | Rennie et al. |
| 2008/0251614 A1 | 10/2008 | Doherty et al. |
| 2010/0026551 A1 | 2/2010 | Szwilski et al. |

FOREIGN PATENT DOCUMENTS

| | | |
|---|---|---|
| CA | 2272541 | 5/1998 |
| CH | 516050 | 11/1971 |
| DE | 3506229 | 8/1986 |
| DE | 3712452 | 11/1988 |
| FR | 2229812 | 12/1974 |
| FR | 2378132 | 8/1978 |
| FR | 2618543 | 1/1989 |

OTHER PUBLICATIONS

Determination Denying Inter Partes Reexamination in Control No. 95/001,629.

Petition Under 37 CFR 1.181 and 37 CFR 1.515 (c) in Control No. 95/001,629.

Decision Denying Petition Under 37 CFR 1.181 and 37 CFR 1.515(c) in Control No. 95/001,629.

Measuring Salt's Effectiveness in New York, Better Roads, Jan. 1995.

"Update" ITS Minnesota vol. 2 Articles, No. 2, Spring Quarter 1998, 5 pages.

U.S. Appl. No. 60/666,650, filed Feb. 25, 2005, 24 pages.

Claim Chart for CTRE Phase IV (SNQ 1), Exhibit CC-1 of Request for Reexamination of U.S. Pat. No. 7,714,705, 101 pages.

Claim Chart for CTRE Phase IV in view of CTRE Phase I, Phase II, and Phase III (SNQ 2) Exhibit CC-2 of Request Request for Reexamination of U.S. Pat. No. 7,714,705, 44 pages.

Claim Chart of CTRE Phase IV in view of Mahoney (SNQ 3) Exhibit CC-3 of Request Request for Reexamination of U.S. Pat. No. 7,714,705, 27 pages.

Claim Chart for CTRE Phase IV in view of Halliday (SNQ 4) Exhibit CC-4 of Request Request for Reexamination of U.S. Pat. No. 7,714,705, 34 pages.

Claim Chart for CTRE Phase IV in view of Trakit 25-A Manual (SNQ 5) Exhibit CC-5 of Request Request for Reexamination of U.S. Pat. No. 7,714,705, 8 pages.

Claim Chart for CTRE Phase IV in view of Biesecker (SNQ 6) Exhibit CC-6 of Request Request for Reexamination of U.S. Pat. No. 7,714,705, 10 pages.

Machine comparison of specification of '650 Provisional Application and specification of U.S. Pat. No. 7,355,509, Exhibit OTH-1 of Request Request for Reexamination of U.S. Pat. No. 7,714,705, 45 pages.

"Concept Highway Maintenance Vehicle," Final Report: Phase Two, Center for Transportation Research and Education (CTRE), Iowa State University, Dec. 1998, 148 pages.

"Highway Maintenance Concept Vehicle," Final Report: Phase Four, Center for Transportation Research and Education (CTRE), Iowa State University, Jun. 2002, 90 pages.

"Highway Maintenance Concept Vehicle," Final Report: Phase Three, Center for Transportation Research and Education (CTRE), Iowa State University, Mar. 2001, 170 pages.

Declaration of Marcia Brink establishing public availability of CTRE Phases I-IV, Exhibit PA-A5 of Request Request for Reexamination of U.S. Pat. No. 7,714,705, 2 pages.

Mahoney "An Advanced Weather Information Decision Support System for winter Road Maintenance," National Center for Atmospheric Research ITS Rocky Mountain Confernece, Salt Lake City, Oct. 2-4, 2002, available at http://www.itsrm.org/downloads/2002 %20Proceedings/Bill%20Mahoney.pdf, 33 pages.

Declaration of Traci Ulberg establishing public availability of Mahoney, Exhibit PA-B2 of Request Request for Reexamination of U.S. Pat. No. 7,714,705, 2 pages.

Trakit-25A Manual, Jan. 19, 2004, available at http://www.idaco.com/TN-SA.pdf, 22 pages.

Biesecker "Broadband Wireless, Integrated Services, and Their Application to Intelligent Transportation Systems" Report of Center for Telecommunications and Advanced Technology, Jun. 2002, 124 pages.

Mahoney et al. "The Winter Road Maintenance Decision Support System (MDDS) Project Update and Future Plans," National Center

(56) References Cited

OTHER PUBLICATIONS for Atmospheric Research, published prior to 2006, available at ams.confex.com/ams/pdfpapers/51856.pdf, 8 pages.
Schell "Real Time, Real Rugged, And Real Profits," Business Solutions, Mar. 1, 2003, available at http://www.bsminfo.com/article.mvc/Real-Time-Real-Rugged-And-Real-Profits-0001?VNETCOOKIE=NO, 2 pages.
Schneider et al. "Thermal Mapping for MDSS" Vaisala Road Weather Systems, 2003, 25 pages.
"Improving Snow Plow Design: Highway Maintenance Concept Vehicle Phase V" Prepared for the Clear Roads Program, ctre Center for Transportation Research and Education, Iowa State University, Apr. 2006, 29 pages.
"Improving Snow Plow Design: Highway Maintenance Concept Vehicle Phase V" Meeting Minutes from the Design Charrette Held in Des Moines Iowa Apr. 26 & 27, 2006, Prepared for the Clear Roads Program, ctre Center for Transportation Research and Education, Iowa State University, Apr. 2006, 21 pages.
Pisano et al., "Intelligent Transportation Systems and Winter Operations in Japan," U.S. Department of Transportation Federal Highway Administration International Technology Exchange Program, Sep. 2003, 60 pages.
"Software | Intelligent Snow Plow" available at http://www.intelligentdevicesinc.com/snow_plow.html, 2008, 1 page.
"Intelligent Snow Plow" Intelligent Devices, available at http://www.intelligentdevicesinc.com/pdf/software/intelligent_snow_plow/idi_snow_plow.pdf, date unknown, pp. 1-2.
"Maintenance Decision Support System—Omaha, Nebraska", May 28, 2008, available at http://www.pdshowcase.org/home/showcase/10, pp. 1-2.
Huft "Status of the MDSS Pooled Fund", available at http://www.ral.ucar.edu/projects/rdwx_mdss/meetings/MDSS_stakeholder_9.2007/MD_session2_huft.pdf, Sep. 18, 2007, pp. 1-12.
"Maintenance Decision Support System (MDSS)", available at http://www.utahltap.org/Services/Workshops/productdemoshowcase/MDSS/registration/agendaMDSS.pdf, May 28, 2008, pp. 1-3.
Huft "Development & Deployment of NCTIP-Compliant Mobile Maintenance Data Collection" available at http://www.nritsconference.org/downloads/Presentations07/B1Huft.pdf, Oct. 2007, pp. 1-12.
"Better bridge deicing on the way!" Better Roads, Jun. 1995, 1 page.
"Cellular technology has new niche, Phones offer mobile control in rural Colorado," by Dinah Zeiger, Denver Post, Aug. 21, 1994, 2 pages.
"Concept Highway Maintenance Vehicle, Final Report: Phase One," Apr. 1997, CTRE, pp. 1-92.
"Developments Improve Road Weather Information Systems," Betters Roads, pp. 21 and 24 available, Oct. 1995.
"GIS: The World's ITS Backbone", Case Study, Environmental Systems Research Institute, Inc. 4 pages, 1997.
"Innovations in ITS," ITE Journal, Dec. 1996, 3 pages.
"ITS applications for magnetic tape", ITS: Intelligent transport systems, Jan./Feb. 1997, 1 page.
"Magnetic strips make snow ploughs smarter", ITS: Intelligent transport systems, Jan./Feb. 1997.
"Maintenance Management and Winter Operations," Transportation Research Record No. 1533, Transportation Research Board, 1996, 7 pages.
"Maintenance Management, Traffic Safety, and Snow Removal," Transportation Research Record No. 1352, Transportation Research Board, 1992, 92 pages.
"McCaw's AirData Network Gets Wheels; Showcases First CDPD-enabled Mobile Office Van from the Streets of Las Vegas at COMDEX/Fall '94", Business Wire, Nov. 14, 1994, pp. 1-2.
"Measuring Salt's Effectiveness in New York," Better Roads, Jan. 1995, 1 page.
"Our Mission: Traveler Services: 100% accurate, anywhere, anytime," VDOT Mar. 3, 2006, 16 pages.

"OutFront—What's Happening in the World of ITS—Study Predicts $400 billion market for ITS over the next 20 years" date unknown, 1 page.
"Phase Two Concept Highway Maintenance Vehicle Work Plan", Appendix G, Prepared by the Center for Transportation Research and Education, Ames, IA, Oct. 1996, 10 pages.
"Riding the Data Highway," Newsweek, p. 97, Mar. 21, 1994.
"Roads Report," edited by Larry Flynn, Roads & Bridges, Mar. 1993, 1 page.
"Rockwell rolls out DataTrax/GPS onboard computer with built-in GPS. (Rockwell Transportation Electronics; Global Positioning System)," Satellite News, Nov. 6, 1995, pp. 1-2.
"RWIS helps snow and ice control," Better Roads, Sep. 1994, 1 page.
"Snow and Ice Control: A Best Practices Review," May 1995, Office of the Legislative Auditor State of Minnesota, pp. 1-148.
"Snow Plowing goes high Tech," CTRE, Aug. 1997, pp. 1-16.
"Snow Removal and Ice Control Technology," Transportation Research Board, Conference Proceedings 16, 1996 pp. 1-174.
Southeast Michigan Snow and Ice Management (SEMSIM), Final Evaluation at End of Winter Season Year 2004, Aug. 1, 2004, 90 pages.
"Technology Transfer—NHI Reinforces Its Partnerships with Industry", Nov. 1996 Transporter, http://www.tfhrc.gov/trnsptr/rttnov96/rd961109.htm, accessed Nov. 2, 2009 2 pages.
"The Wisconsin DOT used an ice detection system and a snow forecasting model to aid in the dispatch of snow plows and deicers saving 4 hours per person for each significant storm (a value of around $144,000/storm), and approximately $75,000 in salt," RITA: Intelligent Transportation Systems, Mar./Apr. 1990, abstract only, 1 page.
"Traffic Sensor System," Better Roads, Dec. 1995, p. 15.
"UK proposes three private traffic control centres", ITS: Intelligent transport system, Jan./Feb. 1997, 1 page.
"Water, Pure and Simple," Discover, pp. 87-88, Jul. 1996.
"Wetlands and road construction: Like Oil and Water?" Technology News, Aug.-Sep. 1997, pp. 1-12.
"What is a Road Weather Information System (RWIS)?" Road Weather Management Programs, printed Oct. 30, 2009, 2 pages.
"Winter Maintenance for the New Millennium," U.S. Department of Transportation, Federal Highway Administration, Oct. 1998, pp. 1-4.
"Winter Maintenance Technology and Practices—Learning from Abroad," Research Results Digest, No. 204, Jan. 1995, NCHRP, pp. 1-16.
"Winter Maintenance Technology and Practices—Learning from Abroad," Road Management & Engineering Journal, Mar. 1, 1997, TranSafety, Inc., pp. 1-9.
1999 APWA North American Snow Conference, Apr. 27-30, 1997, Kansas City, Missouri, pp. 1-22.
Advertisement, "Are You Still Detecting Icy Roads Between Pavement Sensors by the Seat of Your Pants?" Vaisala, date uknown, 1 page.
Appendix A, Literature Search, date uknown, pp. 1-29.
Appendix B, Identify List of Desired Vehicle Capabilities, dated unknown, 12 pages.
Appendix C, Research Funding Sources, 1996, 4 pages.
Appendix C: Motor Carrier Case Study, Evaluation Report vol. II—Case Study Field Notes by Western Highway Institute, ATA Foundation, Feb. 1994, pp. 1-108.
Appendix D, Select Private Sector Partners, 1996, 19 pages.
Appendix E, Develop Description of Systems, 1996, 6 pages.
Axelson, "Winter Road Maintenance System," Pennsylvania Department of Transportation, Maintenance Management, Conference Proceedings 5, Transportation Research Board, 1995, pp. 63-65.
Banasiak, "Snowfighters gather in Salt Lake City," Roads & Bridges, Jun. 1996, pp. 1-2.
Boselly et al., "Road Weather Information Systems vol. I: Research Report," Strategic Highway Reseach Program, Sep. 1993, pp. 1-219.

(56) References Cited

OTHER PUBLICATIONS

Boselly et al., "Road Weather Information Systems vol. II: Implementation Guide," Strategic Highway Reseach Program, Sep. 1993, pp. 1-82.
Boselly, "Benefit-Cost Assessment of the Utility of Road Weather Information Systems for Snow and Ice Control,"Transportation Research Record 1352, pp. 75-82.
Boselly, "Road Weather Information Systems: What are they and what can they do for you?" Transportation Research Record 1387, pp. 191-195.
Bowman, Supplemental Advance Warning Devices: A Synthesis of Highway Practice, NCHRP Synthesis of Highway Practice, Issue No. 186, 1993, 92 pages.
Boynton "The View From Space Satellites keep eye on earthly activity", USA Today, date unknown, 2 pages.
Brochure, "Artificial Intelligence/Expert Systems," Kaman Sciences Corporation, Copyright 1991, 2 pages.
Brochure, "Better Roads . . . Safer Roads . . . More Cost Effective Roads . . . Through Innovations in Technology," Federal Highway Administration, date unknown, 4 pages.
Brochure, "Facts About Southwest Research Institute," Southwest Research Institute, San Antonio, Texas Annual Report from Southwest Research Institute, 1996, 2 pages.
Brochure, "KEMS . . . A Geographic Information System Tailored for Emergency Management Applications," Kaman Sciences Corporation, Article, "Measuring Salt's Effectiveness in New York," Better Roads, Jan. 1995., 4 pages.
Brochure, "Solving Today's Problems for Tomorrow's Safety," Control Products, Inc., date unknown, 2 pages.
Brochure, Enator Telub AB, "Mobile Road Condition Monitoring," Appears to be available as early as 1998.
Brochure, Southwest Research Institute—Guide, 8 pages, Aug. 1996.
Brochure, Southwest Research Institute—Guide, 8 pages, Jan. 1998.
Brown et al., "A Technical Report to the Secretary of Transportation on a National Approach to Augmented GPS Services," Dec. 1994, pp. 1-177.
Chapter 4: Introduction to Technologies, pp. 33-40.
Chapter 8: Winter Operations and Salt, Sand, and Chemical Management, date unknown pp. 1-68.
Chapter 9: Temperature Sensors, date unknown, pp. 1-3.
Chollar, "Revolution in Winter Maintenance," U.S. Department of Transportation, Federal Highway Administration, Winter 1996, vol. 59, No. 3, 3 pages.
Clarus Initiative, Read Ahead Packages for Clarus Initiative Coordination Committee Meeting #4, Aug. 8-9, 2006, Falls Church, VA, pp. 1-33.
Concept Paper, Northern Virginia Transportation Management Program: Enhancements for Incident Response and Emergency Operations Command/Control and Information Sharing, Jan. 25, 2001, 4 pages.
Crosby "Visibility a Key Component of Weather Systems," Feedback on article, "Managing Winter Weather", Dec. 1996, 1 page.
Cumberledge et al., "Integration of Management Systems for Maintenance Activities," Pennsylvania Department of Transportation, Maintenance Management, Conference Proceedings 5, Transportation Research Board, 1995, pp. 26-30.
Dawley et al., "Ergonomic Factors in a one-person operation of snow plows with attached wing plows," Presentations from the 10th Equipment Management Workshop, Portland, OR, 1994, pp. 37-41.
Draft Proposal, Policy Recommendations to the RAQC Concerning the Comprehensive Long Range Air Quality Plan, from the Street Sanding/Cleaning Subcommittee City of Aurora Public Works Dept. (Colorado), Nov. 1, 1995, 2 pages.
Environmental Monitoring System (EMS), IPS MeteoStar, printed Oct. 30, 2009, 4 pages.
Excerpts from America Online: KKlean, Jun. 30, 1995, 6 pages.
Flanagan, "The Virtual Consolidated Operations Center," pp. 1-20, 1995.
Fleege "Equipment in Scandinavian Countries", Presentations from the 10th Equipment Management Workshop, Portland, OR, 1994, pp. 105-108.
Fleege et al., "Spreader Equipment for Anti-Icing", Maintenance Management and Safety, Transportation Research Record No. 1509, Transportation Research National Research Council, 1995, pp. 22-27.
GL 400 Spreader Control Presentation, Component Technology, Oct. 25, 1997, 12 pages.
Goodwin, "Best Practices for Road Weather Management," May 2003, pp. 1-131.
Hanbali et al., "Traffic Volume Reductions due to Winter Storm Conditions," Transportation Research Record 1387, 1993, pp. 159-164.
Highway Capacity Manual, Chapter 22: Freeway Facilities, 2000, 68 pages.
Hudson, "Let it Snow, let it snow, let it snow: 11 ways to maintain winter roads," http://americancityandcounty.com/mag/government_let_snow_let/, Apr. 1, 1996.
Hunter "1994 Midwestern States Equipment Management Conference" Presentations from the 10th Equipment Management Workshop, Portland, OR, 1994, pp. 111-113.
Hunter, "Snow Plow Trucks—Specifications for the Twenty-First Century," Presentations from the 10th Equipment Management Workshop, Portland, OR, 1994, pp. 31-35.
Hyman et al., "Field Testing and Evaluation of Innovative Technologies for Maintenance Data Collection," Transportation Research Board Conference Proceedings, 1995, No. 5, pp. 9-17.
ITIB Major IT Project Status Report for Jan. 2009—Summary, 9 pages.
Kuemmel "Managing Roadway Snow and Ice Control Operations," NCHRP Synthesis of Highway Practice, Issue No. 207, National Cooperative Highway Research Program, pp. 1-66.
Lasky et al., "Automated Highway Systems (AHS) Classification by Vehicle and Infrastructure," Advanced Highway Maintenance & Construction Technology Research Center, Jan. 25, 1994, 65 pages.
Manfredi et al., "Road Weather Information System Environmental Sensor Station Siting Guidelines," Report No. FHWA-HOP-05-026, Federal Highway Administration, Apr. 2005, U.S. Department of Transportation, 52 pages.
Manfredi et al., "Road Weather Information System Environmental Sensor Station Siting Guidelines," Version 2.0, Nov. 2008, U.S. Department of Transportation, 71 pages.
Marketing Document, Didactics Incorporated, "IR Applications for Ice and Snow Control," 1998, 29 pages.
Markow et al., "Highway Maintenance and Integrated Management Systems," Transportation Research Board Conference Proceedings, 1995, No. 5, pp. 31-37.
Montagne et al., "Oregon Green Light CVO Evaluation, Final Report, Detailed Test Plans 2 and 3, Evaluation of the Road Weather Information System (RWIS)" Jun. 2000, 89 pages.
Nixon "Foreign Technology Applications for the Winter Maintenance Concept Vehicle," Iowa Institute of Hydraulic Research, 1996, Appendix F, Foreign Technology Applications Report, 16 pages.
On-Site Weather, Weather or Not, date unknown, 1 page.
Pell, "An Improved Displacement Snowplow," Strategic Highway Research Program, May 1994, pp. 1-93.
Peterson, "Snow Plow Truck Cab Ergonomics: Summary," Presentations from the 10th Equipment Management Workshop, Portland, OR, 1994, p. 36.
Pilli-Sihvola et al., "Road weather service system in finland and savings in driving costs," Transportation Research Record No. 1387, 1992, pp. 196-200.
Pilli-Sihvola, "Weather-Related Traffic Management in the E18 Finnish Test Area," Finnish Naitonal Road Administration, pp. 1-4.
Pisano et al., "Intelligent Transportation Systems and Winter Operations in Japan," Sep. 2003, pp. 107.
Press releases and product launches 2009, Vaisala to launch Road Weather Decision Support Sytem technologies, Jul. 9, 2009, 1 page.
Rasmussen, Erik: "Mobile Doppler Radar: A new tool to investigate tornadic storms"; NSSL Briefings; Fall/Winter 1995: pp. 10-11.

(56) References Cited

OTHER PUBLICATIONS

Reiter et al., "Artificial Intelligence-supported weather predition for highway operations," Strategic Highway Research Program, 1993, p. 49, Abstract only.
Reiter et al., "Detailed weather prediction system for snow and ice control," Transportation Research Board, 1387, 1993, pp. 223-230.
Report on the 1998 Scanning Review of European Winter Service Technology, National Cooperative Highway Research Program, Research Results Digest, Apr. 1999, No. 238, 34 pages.
Road Condition-Weather Monitor: System to Determine Pavement Surface and Atmospheric Conditions, North Dakota DOT, 1 page, Sep. 1997.
Roosevelt et al., "Automatic vehicle locations system in urban winter maintenance operations," Transportation Research Record 1741, Paper No. S00-0044, pp. 1-5.
Roosevelt et al., "Final Report: Lessons Learned from a Pilot Project of an Automatic Vehicle Location System in an Urban Winter Maintenance Operations Setting," Virginia Transportation Research Council, Apr. 2002, pp. 1-17.
SAIL 2 Evaluation, Mn/DOT Contract No. 86353, Jan. 2007, 50 pages.
Scan FP 2000 Sensor Advertisement, Surface Systems Inc., date unknown, 2 pages.
Scapinakis et al., "Communications and Positioning Systems in the Motor Carrier Industry," Program on Advanced Technology for the Highway Institute of Transportation Studies University of California at Berkeley, PATH Research Report, pp. 1-82.
Smith, "A new paradigm for winter maintenance decisions," 1998 Transportation Conference Proceedings, pp. 1-4.
Smith, "From Concept to Reality: Advanced Technology and the Highway Maintenance Vehicle," Presentations from the 12th Equipment Management Workshop, 1998, pp. 4-14.
Smithson, "AASHTO's Winter Maintenance Program: A Proactive Approach to International Technology Transfer," Iowa Department of Transportation, pp. 15-21.
Smithson, "Americans can Learn a Lot from European, Japanese Snowfighters," Roads & Bridges, pp. 30-32 available, Jun. 1995.
Smithson, "DOTs push for better snow control vehicles," Better Roads, Jun. 1997, pp. 27-29.
Smithson, "Japanese and European Winter Maintenance Technology", Pennsylvania Department of Transportation, Maintenance Management, Conference Proceedings 5, Transportation Research Board, 1995, pp. 66-68.
Snow Removal and Ice Control Technology: selected papers presented at the Fourth International Symposium, Reno, Nevada, Aug. 11-16, 1996, Transportation and Research Board, published 1997, pp. 1-174.
Snowbreak Forest Book—Highway Snowstorm Countermeasure Manual, FHWA-PL-97-010, Japanese Original Printed Mar. 1990, Translated from Japanese, 1996, 107 pages.
Stern et al., "Vehicles as Mobile Sensing Platforms for Critical Weather Data," Briefing for the VII Weather Applications Workshop #1, Feb. 22, 2006, National Center for Atmospheric Research, Boulder, CO, pp. 1-35.
Surface Patrol™, available at http://www.ae-traffic.com/Surface_Patrol.html, printed Oct. 30, 2009, pp. 1-3.
Takeuchi et al., "Variation in motorist visual range measured by vehicle-mounted sensor," Transportation Research Record, 1387, 1993, pp. 173-177.
Task 9 Automatic Vehicle Locating System (AVL) Pilot Program for Snow Removal Operations, End of Program Report, Final, May 10, 2000, 17 pages.
The Intelligent Vehicle, May 1997, 1 page, printed Feb. 5, 2010.
Third International Symposium on Snow Removal and Ice Control Technology, Minneapolis, Minnesota, Sep. 14-18, 1992. Preprints: vol. 1 and vol. 2, Abstract only.
Thornes, "Cost-Effective Snow and Ice Control for the 1990s," Snow Removal and Ice Control Technology, Transportation Research Record No. 1387, 1993, 7 pages.
Vaisala Guardian, "Road Weather Information Systems,", printed Oct. 30, 2009, 1 page.
Vaisala Guardian, The most effective and affordable road weather information system for cities, towns and counties, printed Oct. 30, 2009, 3 pages.
Vaisala U.S. National Lightning Detection Network, printed Oct. 30, 2009, 1 page.
VDOT VOIS/Weather Information Processing and Distribution (Inventory Element), Virginia.gov, printed Oct. 30, 2009, 4 pages.
Viking '79 Rover Study Final Report, vol. I, Summary, vol. II, Detailed Technical Volume, NASA CR-132417, Martin Marietta Corporation, Mar. 1974, 4 pages.
Zeyher, "Just Drive!," Roads & Bridges, Apr. 2002, 3 pages.
"µWEBox Lite GSM/GPRS (GPS)—Revision 1.2", Comtech M2M, date unknown, pp. 1-60.
"µWEBox Lite Product FAmily", Comtech M2M, 2004, pp. 1-60.
"BlueTree Wireless Data—Wireless Modems", printed Jan. 4, 2007, pp. 1-4.
"GPRS GPS modem GPS GPRS modems—Comtech M2M", available at http://www.comtechm2m.com/gprs-modem/gprs-gps-modem.htm, printed Jan. 4, 2007, pp. 1-4.
"GPS Information", available at http://www.alltrackusa.com/gps_info.html, printed Jan. 4, 2007.
"GPS Tracking, GPS Vehicle Tracking products for monitoring of teen drivers", available at http://www.alltrackusa.com/, printed Jan. 4, 2007, pp. 1-4.
"Gps Wireless Modem—KnowledgeStorm Wireless Results for Gps Wireless Modem", printed Jan. 4, 2007, pp. 1-5.
"GPS-150 Automatic Vehicle Location Unit", CES Wireless Technologies Brochure, Jan. 9, 2003, 11 pages.
"Sierra offers GPS wireless modem", Globe Technolgy.com, Sep. 9, 2003, 1 page.
"TransCore Set to Develop DSRC, GPS, and Satellite Combined Communications Modem; Move Will Merge Disparate Telematics Technologies into One Device for In-Vehicle Safety Applications", Business Wire, Nov. 7, 2005, pp. 1-4.
"Ulster County Sheriff Media Release", dated Nov. 17, 2006, pp. 1-8.
"Using GPS for Vehicle Tracking, Asset Tracking and Fleet Management", available at http://www.cjseymour.plus.com/gps/gps.htm, dated Mar. 22, 2006, pp. 1-11.
"Vehicle Tracking Technology", available at http://www.trackmyvehicle.com/locate_technology.asp, printed Jan. 4, 2007, 2 pages.
Automatic Vehicle Locator System, date unknown, 1 page.
Campbell, Susan J., "TotalRoam Proves Successful Enough for Expansion in Three Organizations," Available at http://www.tmcnet.com/news/2006/02/14//1371250.htm, Feb. 14, 2006, 7 pages.
Dahlgren, LLC,2004, available at http://www.dahlgrenllc.com/AboutUs.htm, accessed Jun. 10, 2009, 1 page.
Declaration of Kevin K. Groeneweg Under 37 CFR Section 1.98 (15 pgs.), including Exhibits A (10 pgs.), and B (1 pg.).
Falkenberg et al., "Precise Real-Time Kinematic Differential GPS Using a Cellular Radio Modem", Nov Atel Communications Ltd., presented at the IEEE Position Location an dNavigation Symposium PLANS 92, Monterey, CA, Mar. 24-27m 1992.
Hoffberg, "Information Collection System for Traffic Mapping, has Mobile Units with Communication Device Communicating Traffic Information with Central Monitoring Station and Prioritized Information with Corresponding Mobile Unit," Derwent, Sep. 14, 2004, 2 Pgs (Believe to correspond to U.S. Pat. No. 6,791,472 disclosed herein)
Junxion, Inc., "Field Commander junxion box remote management", Junxion, Inc., Seattle WA, 2005-2006, 1 page.
Junxion, Inc., "Junxion Box, User Guide", Model JB-110b (Wi-Fi and Ethernet LAN), Firmware Version 1.3, User Guide Revision B, Junxion, Inc., Seattle WA, 2004-2005, 48 pages.
Junxion, Inc., "Junxion Box, User Guide", Model JB-110e (Ethernet LAN only), Firmware Version 1.3, User Guide Revision A, Junxion, Inc., Seattle WA, 2004-2005, 44 pages.
Junxion, Inc., "Junxion Box; device durability testing", Junxion, Inc., Seattle WA, 2005-2006, 1 page.

(56) References Cited

OTHER PUBLICATIONS

Junxion, Inc., "Junxion Box; wireless WAN router", Junxion, Inc., Seattle WA, 2004-2006, 2 pages.

Junxion, Inc., "Junxion Complete; turn-key WWAN solutions", Junxion, Inc., Seattle WA, 2005-2006, 1 page.

Junxion, Inc., "Why Junxion?five reasons to consider", Junxion, Inc., Seattle WA, 2005-2006, 1 page.

Manpage of PPP, "PPPD", Available at http://iie.fing.edu.uy/ense/redatos/links/lab4/pppd.html, Aug. 3, 2005, 24 pages.

Mobile Competency, "Total Roam; The Business Case for Connection Persistence in Enterprise Wireless", White Paper prepared for Padcom, Mobile Competency Inc., Providence RI, 2005, 4 pages.

NetMotion Wireless Inc., "Best Practices for Wireless CRM", NetMotion Wireless Inc., Seattle WA, 2004, 5 pages.

NetMotion Wireless Inc., "Mobiity XE; Get Connected, Stay Connected.", NetMotion Wireless Inc., Seattle WA, 2005, 6 pages.

NetMotion Wireless Inc., "Mobility XE Compatibility Guide", Available at http://www.netmotionwireless.com/resources/compatibility.asp, 2005, 2 pages.

NetMotion Wireless Inc., "NetMotion Mobility XE and Mobile IP", Available at http://www.netmotionwireless.com/lib/PrintPage.asp?REF=, 2005, 4 pages.

NetMotion Wireless Inc., "NetMotion Mobility XE Link Optimization for Wireless WANs", NetMotion Wireless Inc., Seattle WA, 2005, 5 pages.

NetMotion Wireless Inc., "NetMotion Mobility XE Scalability", NetMotion Wireless Inc., Seattle WA, 2005, 6 pages.

NetMotion Wireless Inc., "Policy Management Module", Available at http://www.netmotionwireless.com/production/info/policy_mgt_sheet.asp, 2005, 3 pages.

NetMotion Wireless Inc., "Technical Overview for Network Administrators", NetMotion Wireless Inc., Seattle WA, 2005, 9 pages.

NetMotion Wireless Inc., "The Key to Mobility", Available at http://www.netmotionwireless.com/products/mobility_keys.asp, 2005, 5 pages.

NetMotion Wireless Inc., "What's New in Mobility XE", Available at http://www.netmotionwireless.com/products/whatsnew_663.asp, 2005, 10 pages.

NetMotion Wireless Inc., "Wireless LANs: The Essentials for Saving Your Sanity", NetMotion Wireless Inc., Seattle WA, 2004, 6 pages.

NetMotion Wireless Inc., "Wireless Wide Area Networks: Trends and Issues", NetMotion Wireless Inc., Seattle WA, 2005, 6 pages.

North American Light Rail Terminology, Jun. 7, 2008, available at http://www.lightrail.com/terminology.htm, accessed Dec. 20, 2008, 26 pages.

Ortega et al., "Development of an In-House Automated Vehicle Location System", Proceedings of the 2003 Mid-Continent Transportations Research Symposium, Ames, Iowa, Aug. 2003, 7 pages.

Padcom Inc., "6100 Remote Access Router", Available at http://www.padcomusa.com/remote-access-router-6100.shtml, undated, 1 page.

Padcom Inc., "8100 Remote Access Router", Available at http://www.padcomusa.com/remote-acess-router-8100.shtml, undated, 2 pages.

Padcom Inc., "CDPD to Public Next-Generation Networks: Understanding the Transition", Padcom Inc., Bethlehem, PA, 2005, 8 pages.

Padcom Inc., "Point of Service Architecture", Available at http://www.padcomusa.com/rar-architecture-pos.shtml, undated, 1 page.

Padcom Inc., "Products; How TotalRoam Works", Available at http://www.padcomusa.com/products-how-tr-works.shtml, undated, 2 pages.

Padcom Inc., "Products; TotalRoam Connect; Mobile VPN", Available at http://www.padcomusa.com/products-tr-connect.shtml, undated, 3 pages.

Padcom Inc., "Products; TotalRoam Mobile Virtual Network (MVN)", Available at http://www.padcomusa.com/products-totalroam-mvn.shtml, undated, 4 pages.

Padcom Inc., "Remote Access Routers", Available at http://www.padcomusa.com/remote-access-routers.shtml, undated, 1 page.

Padcom Inc., "TotalRoam; Technical Overview", Padcom Inc., Bethleham, PA, 2005, 42 pages.

Padcom Inc., "Use Case Scenario: POS", Available at http://www.padcomusa.com/rar-scenario-pos.shtml, undated, 1page.

Padcom Inc., "Use Case Scenario: Van", Available at http://padcom.com/rar-scenario-van.shtml, undated, 1 page.

Padcom Inc., "Vehicle Area Network Architecture", Available at http://www.padcomusa.com/rar-architecture-van.shtml, undated, 1 page.

Xie et al., "Going beyond automatic vehicle location" Nov. 2004, 10 pages.

Zoom: Driving Transportation Informatics, available at http://www.zoominfosystems.com/, accessed Jun. 10, 2009, 1 page.

PCT Application No. PCT/US07/62751, combined International Search Report and Written Opinion (Nov. 8, 2007).

International Search Report for International (PCT) Application No. PCT/US08/88670, mailed Mar. 6, 2009.

Written Opinion for International (PCT) Application No. PCT/US08/88670, mailed Mar. 6, 2009.

International Report on Patentability for International Application No. PCT/US2007/062751, issued Sep. 2, 2008.

\* cited by examiner

Fig. 9

INFORMATION DELIVERY AND MAINTENANCE SYSTEM FOR DYNAMICALLY GENERATED AND UPDATED DATA PERTAINING TO ROAD MAINTENANCE VEHICLES AND OTHER RELATED INFORMATION

RELATED APPLICATION DATA

This application claims the benefit of and priority under 35 U.S.C. §119(e) to U.S. Patent Application No. 60/947,257, filed Jun. 29, 2007, entitled "Information Delivery And Maintenance System For Dynamically Generated And Updated Data Pertaining To Road Maintenance Vehicles And Other Related Information," which is incorporated herein by reference in its entirety.

This application is a continuation of U.S. application Ser. No. 13/560,797, filed Jul. 27, 2012, which is a continuation of U.S. application Ser. No. 12/147,837, now U.S. Pat. No. 8,275,522 filed on Jun. 27, 2008, all of which are incorporated herein by this reference.

FIELD OF THE INVENTION

The invention relates generally to data collection, processing, and delivery in conjunction with mobile vehicles and particularly to the collection and the transmission of data to and from various mobile and remote destinations, such as to and from road maintenance and/or construction vehicles.

SUMMARY OF INVENTION

An exemplary embodiment of the present invention is directed generally to collecting selected types of information from various sources, then transmitting at least some of the data collected to a remote server, then dynamically compiling and processing this data with information from other similar and separate sources, to provide useful and relevant information, such as vehicle and location-specific road maintenance radar, forecasts and treatment recommendations, and then finally transmitting data back to the vehicles in the field for one or more of the appropriate deployment of equipment, instructions and the automated or manual application of materials.

In one exemplary embodiment, a method includes the steps of:

collecting information from the vehicles, such as vehicle state and/or road conditions, by a variety of means which may include vehicular sensors or manual input by the driver or vehicular profile containing maintenance history or physical restrictions or conditions of the vehicle;

establishing a connection to a remote server through a means such as a wireless network connection or the equivalent;

transmitting the collected information through the established connection to the remote server;

compiling, aggregating, and analyzing the transmitted information, possibly with other information that has been collected, stored, or otherwise come to exist on the remote server into a relevant and useful form; and transmitting the newly dynamically generated information as well as other information back to the vehicle in a versatile and dynamic format, such as a dynamically generated webpage or data stream, accessible and readily available to the vehicle.

In another exemplary embodiment, a data collection and transmission method is provided that includes the steps:

a sensor or equivalent hardware collecting information regarding road and/or weather conditions;

establishing a connection to a remote server through a means such as a wireless network connection or the equivalent;

transmitting the collected information through the established connection to the remote server; and storing the data on the server, which can be readily available to other processes or applications in the compilation and/or aggregation of information, such as extrapolation of data to model current and future weather characteristics, to be transmitted to other specified designations.

An exemplary embodiment of the present invention can provide a number of exemplary advantages depending on the particular configuration. For example, the use of dynamically generated information regarding the continuously changing weather conditions and temperatures can permit the snowplow drivers to adjust their routes and actions accordingly, to enhance efficiency and effectiveness. When the dynamically generated information and recommendation is transmitted to the snowplow, the driver can either accept or modify recommendations, while accurately assessing the changing conditions and adjusting the amount of chemicals or other substances or strategic plans used to clear the roads of ice and snow. Such actions are recorded and can be sent back to the remote server. The conventional method of relaying information to the driver of the snowplows, such as radio, text messages or telephone calls, is cumbersome and does not necessarily provide up-to-date and accurate information regarding road and weather conditions which may ultimately lead to excessive or inefficient use of resources. Comparatively, this invention can relay the most accurate and current information available between the remote server to the driver, and/or between two or more of the same.

Other potential advantages of the invention include the variety of different kinds of information accessible to drivers in various formats that may give them a better depiction of the real-world conditions they face; a more robust implementation of connecting to different transmission channels, such as wireless connections or the equivalent to ensure a greater probability of timely transmissions of data; the ability to create various strategies and apply cost/benefit analysis on each to determine which recommendation would be the most cost-effective and beneficial; and a more accessible remote server which can be accessed directly or indirectly to generate more detailed and accurate analysis, recommendations and reports for or of activities performed by the road maintenance vehicles, control road maintenance activities on vehicles remotely, and record and view historic, present and projected weather and maintenance information to better prepare, respond and analyze future scenarios.

An additional aspect of the invention relates to a display, mountable in a vehicle that can illustrate the status of one or more of various functions, conditions and sensors. The data on the display can also be color-coded to assist with readability. For example, green can be active or "ok," yellow designating caution, and red, for example, a problem area such as a maintenance vehicle that has stopped. Additionally, grey can be used for portions that, when selected, display additional information. For example, a grey camera icon can be provided on the display that when selected opens, for example, a pop-up window that shows the camera image from that particular location.

Another aspect of the invention relates to providing a web-based interface, that can be dynamically generated, and accessed from a plurality of locations, such as within a movable maintenance vehicle.

Additional aspects of the invention relate to a dynamically generated web page based on the location, such as GPS coordinates, of a movable maintenance vehicle. Examples of location-specific information can include radar loops, road information, other maintenance vehicle information, detailed location-specific weather forecasts, and the like. The ability to refresh this web page can be done either manually, for example at the request of the driver, or automatically, such as every predefined time period or when the vehicle enters a predefined area.

Additional aspects of the invention relate to user profiles for the displays that can govern such things as color scheme, layout, types of information displayed, or in general any information available to or being sent from the maintenance vehicle. The user profile can be selected by traditional alpha/numeric entry, fingerprint, id card, RFID, or the like.

Aspects of the invention also relate to providing a display that is capable of displaying alert messages that can be generated on a dynamic basis and displayed, with or without an audio alert, to a maintenance vehicle driver.

Other aspects of the invention relate to the ability to calibrate and forward various information sources from the maintenance vehicle to a central data repository. In general, any aspect of the maintenance vehicle can be monitored such as whether it is running, whether the snow plow blade is up or down, the amount of deicing agent or sand onboard, the amount of time the truck has been running, fuel levels, engine temperature, which side deicing fluid is being sprayed on, the location of the truck, the lane that the truck is in, or in general any information that can be monitored can be forwarded from the maintenance vehicle to the central information repository.

Additional aspects of the invention relate to being able to see, from a remote location, the display as viewed by a user in a maintenance vehicle.

An additional aspect of the invention relates to monitoring and tracking the activity of a maintenance vehicle for reporting functions. For example, if roadside weed spraying is occurring, the track at the end of the day, spray quantity, weather information, and the like, can be used to generate a report for compliance, such as an EPA Compliance Report.

An additional aspect to the invention allows a maintenance vehicle to enter information about specific locations in a roadway, such as where potholes are occurring, and, knowing the vehicle location, the system can map the location of the potholes and forward the information to the repository. This information could then be forwarded to, for example, the pothole-repair group for maintenance.

Additional aspects of the invention relate to installing a camera in the maintenance vehicle, with the feed to this camera being capable of being forwarded to one or more destinations. For example, a camera can be installed on the front and rear of the vehicle, with the front camera images being forwarded to the information repository to assist with maintenance, such as snow removal, with the rear camera image being displayed for the truck driver to assist in visualizing the effectiveness of the plowing and/or deicing procedures.

An additional aspect of the invention relates to parallel processing for different types of data feeds with the different types of data feeds being handled in different manners, and by different applications, correlated to the type of data feed.

Another aspect of the invention relates to creating a speed map utilizing passive tags that are installed on a windshield, such as a toll tag. In that the total tags are generally placed in the front window, one can passively read these tags at point A and point B and can figure out very cost effectively how fast a driver traveled between the points. Additionally, the travelled speed can be correlated to a particular lane, in that tag readers are generally lane-specific.

Utilizing a combination of speed mapping, and information from the one or more maintenance vehicles, this information can be assembled and forwarded to, for example, drivers and/or transportation agencies to provide real-time information or near real-time information about the status of roads, and in particular, lanes of particular roads.

This information can be analyzed and supplemented with the use of a prediction agent that can factor in various information such as weather forecasts, temperatures, location of maintenance vehicles and the like to predict traffic patterns and/or problems at particular locations at specific times. The prediction agent can also assist with determining maintenance routines and procedures.

Another aspect of the invention relates to the integration of the spreading of a particular chemical, such as mag chloride, and the dissipation rate of that chemical based on one or more of traffic load and weather conditions. This can be used to assess and manage and predict runoff time of materials applied to the road that can assist in coordinating a maintenance schedule.

An additional aspect of the invention relates to utilization of weather and traffic information to assist with concrete delivery. For example, concrete pumper truck booms should not be utilized if wind speed is expected to be above a particular threshold. Weather information can be forwarded to the concrete pumper to alert them of predicted wind speeds in excess of a threshold.

Additional aspects of the invention relate to the ability to track equipment usage, such as RPMs, time in operation, and the like, that can then be used, for example, for warranty information, maintenance, and/or repairs.

With on-board cameras, maintenance vehicle users can also use these cameras in the context of, a helmet cam, that allows images from the truck to be displayed to, for example, a maintenance or repair facility to facilitate repair of a vehicle that has broken down.

Still further aspects of the invention relate to utilizing different menus based on season changes. For example, during the summer, the menu could be customized to allow a user to identify smoke across the road, debris in the road, shoulder repair, leaf spraying, paint spraying, etc., while in the winter the menu could be directed to such functionality as snow plowing, deicing applications, avalanches, and the like. In general, menus can be customized based on one or more of seasons, type of maintenance vehicle, industry, or in general any environment in which the system is implemented.

Aspects of the invention also relate to retrofitting a maintenance vehicle with the appropriate sensors such that the maintenance vehicle becomes a remote weather station. This remotely secured weather data can then be transferred to the central information repository.

Aspects of the invention also relate to the identification of special segments of roadways that may need to be treated differently than adjacent segments. For example, for a road segment that is continuously in the shade, sensors on maintenance vehicles can detect this pattern and use that information as feedback to the information repository. The information can then be used for assisting with maintenance of that special section. For example, if the special section is always in the shade, it may need more anti-icing agent than adjacent sections of the roadway that receive sun.

Aspects of the invention further relate to synchronizing the data from the various sources to a common clock, such as that used by the GPS system.

Additional aspects of the invention relate to monitoring and maintaining records of vehicle usage for tax accounting.

Still further aspects of the invention relate to assigning one or more of a truck number and installed system number to the combination of the maintenance vehicle and the installed system to allow for identification of the maintenance vehicle.

Still further aspects relate to having a driver login to identify the driver and the truck they are driving. This can be correlated to the type of equipment on the truck as well as the skill level of the driver.

Aspects of the invention also relate to an expert system that has the capability of predicting and issuing instructions relating to road maintenance, such as snow removal.

Aspects of the invention also relate to an expert system that has the capability of predicting and/or issuing instructions and/or providing data back to one or more remote locations at least based on data received from the one or more remote locations. Exemplary environments the system can be used with are road maintenance, firefighting, construction, delivery, shipping, law enforcement, traffic management, and in general, any environment where the coordination and assimilation of data from disparate sources is needed.

Still further aspects of the invention relate to stationary maintenance equipment management, such as stationary de-icing systems, and their use in conjunction with one or more other aspects of this invention. As with the other systems and equipment described herein, various information can be forwarded from the stationary maintenance system, such as liquid de-icing levels, pressure in the lines, temperature information, video information, sump pump activity, and in general, any information from the stationary maintenance system.

Additional aspects of the invention relate to the ability to program roadside signs from a mobile maintenance vehicle.

Still further aspects of the invention relate to color coding and on-board display in a maintenance vehicle with the color coding corresponding to specific sections of one or more roads.

These and other advantages will be apparent from the disclosure of the invention or inventions contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, expert system or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The present invention can be more readily understood in conjunction with the accompanying diagrams and figures, in which:

Figure 9:
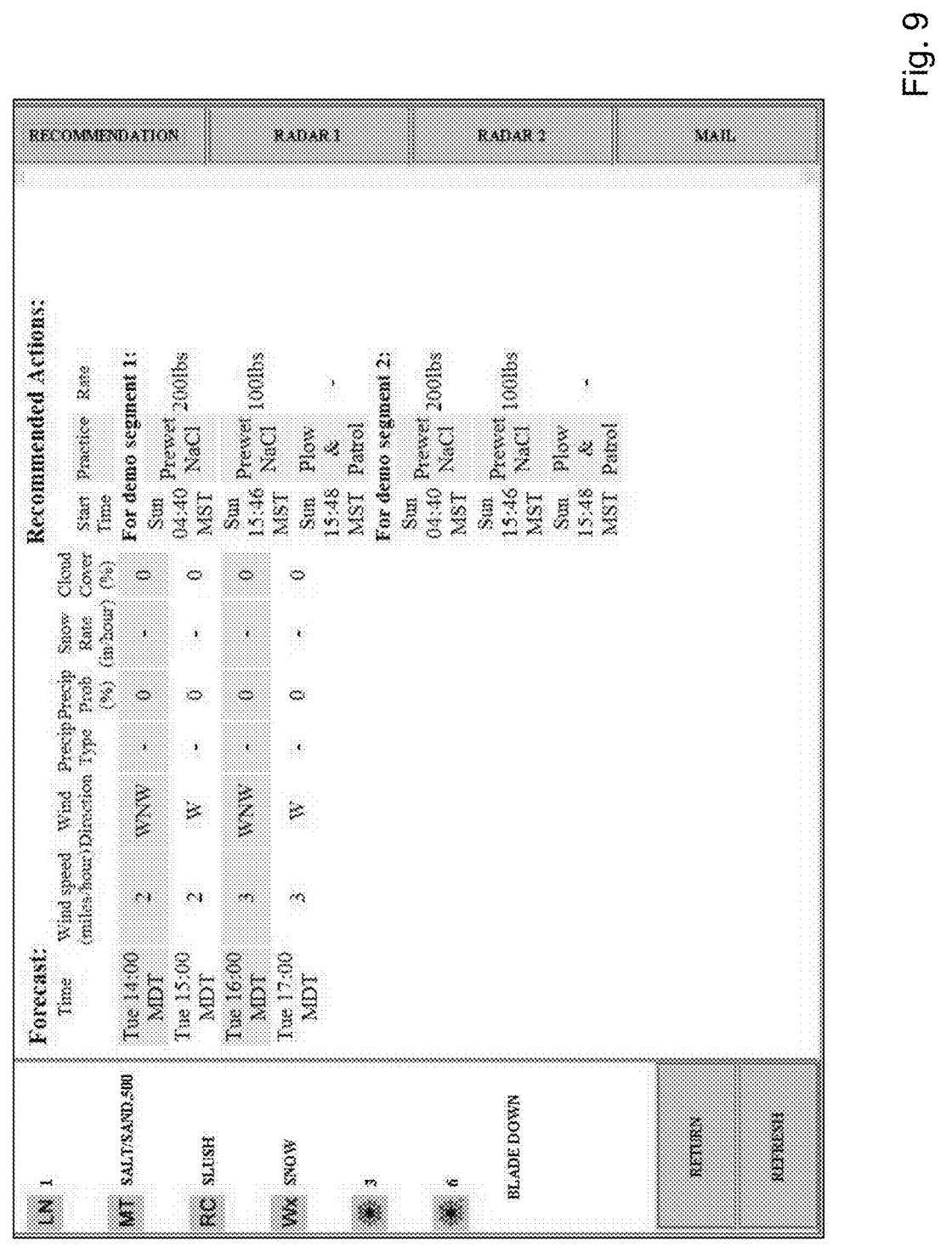

FIGS. 8-11 illustrate exploded views of some of the interfaces according to this invention.

DETAILED DESCRIPTION

Figure 1:
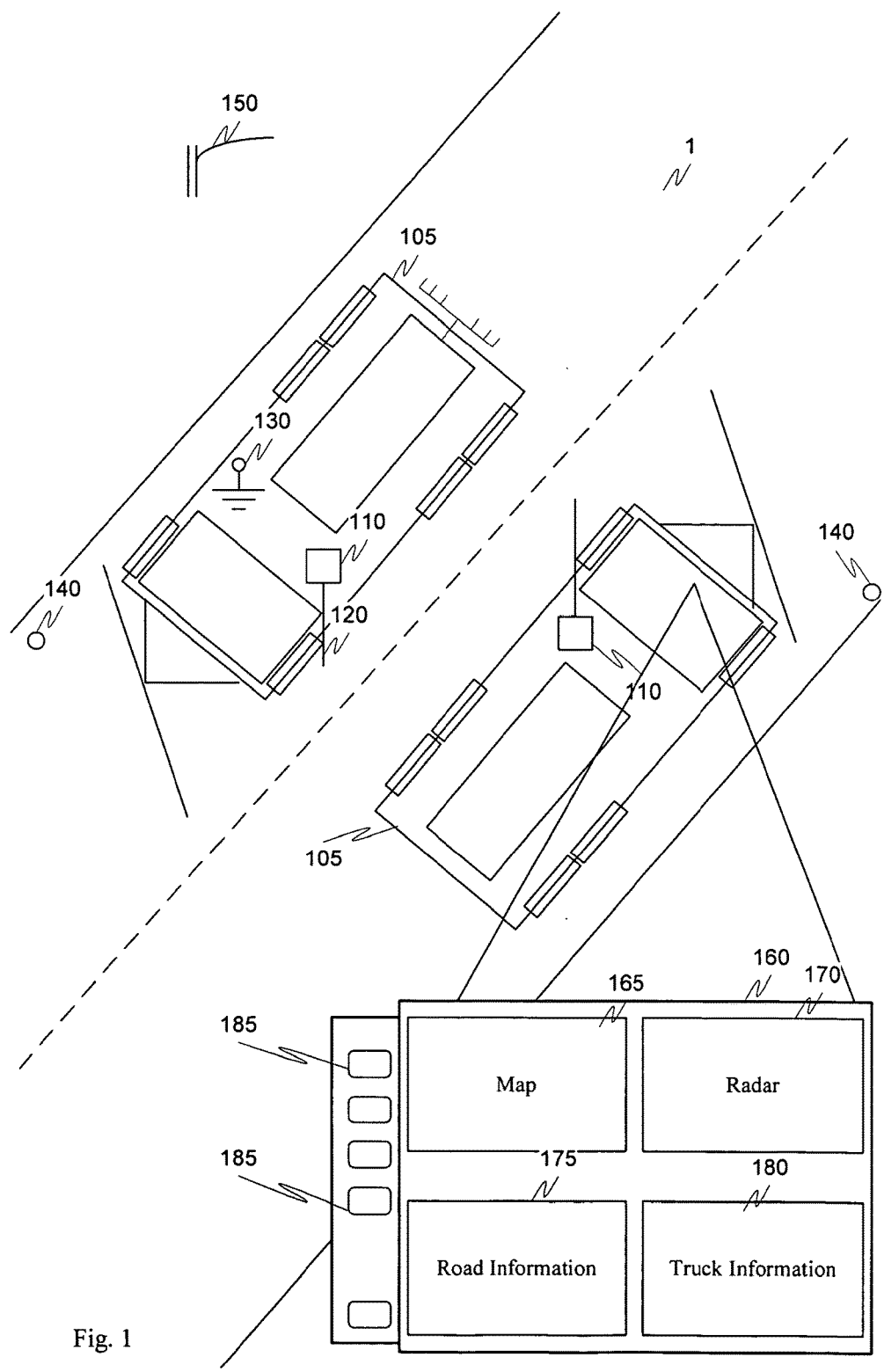
FIG. 1 is an environmental overview of the information management system according to this invention.

The following exemplary embodiments will generally be discussed in relation to a road maintenance embodiment, and in particular to snow and ice removal sensors and equipment. However, in general, the system, methodologies and techniques described herein can be applied to other industries, environments, types of vehicles and sensors. As such, there may be a corresponding change in one or more of the type(s) of data depending on the operational environment and a corresponding change in the type(s) and format of information displayed on the various devices.

In one exemplary embodiment, the information delivery system allows information to be sent to and received from road maintenance vehicles. The system collects and transmits information collected through various sources, which include sensors onboard a road maintenance vehicle, data collected from weather pods and weather stations, data collected from third party sources, information from other maintenance vehicles or sources, and information derived from collected data. Field information is then transmitted to and stored on a remote central server through an established connection, such as through a commercial carrier for wireless networks. Information from other sources may be collected through server-to-server links. All information can then be stored and processed on the remote server or a combination of servers working together. The stored and processed information can be accessed locally and directly by central dispatch and internal personnel, by dispatch assistants or related offices, as well as the traveling public if allowed, through PCs and laptops, or through mobile devices such as cell phones and PDAs, or remotely by road maintenance vehicles and other in-vehicle systems through, for example, a wireless connection.

Once the system determines which road maintenance vehicle is requesting information by either manual or automated updates, a vehicle specific report or aggregate of information that will be most relevant for the requesting vehicle as well as a vehicle-specific combination of radar, forecasts and treatment recommendations are generated. Applying various techniques and software processes to the collected data produces this information and recommendation. The information and recommendation is then dynamically placed on a webpage or into another data format for transmission to the field systems.

This display allows for relatively unrestrained, dynamically generated, truck and location-specific information to be accessible to the vehicle or, in general, to any location. This is in contrast to the relatively limited capabilities previously available through text messaging or oral communications via phone or radio. A dynamically generated webpage has the versatility to display one or more of images and multimedia, (and audio through an associated speaker) as well as stay as current as possible, depending on the availability of network connections in the area. The display of information can include without limitation a seamless integration of various types of information, such as weather radar loops, weather forecasts as well as current conditions, history of road maintenance activity in the area, information collected other road maintenance vehicles, and camera images. It also allows the vehicle to directly communicate with one or more of central dispatch and other driver(s) through messaging as well as communication with other road maintenance vehicles through the remote server. More than one server may be joined to enhance processing power and capabilities, as well as to integrate data from multiple states and other entities.

Snow Plow Application

As illustrated in FIG. 1, one exemplary implementation of the present invention is the snow plow application. As shown in FIG. 1, the snow plow application 1 includes snow plows 105, an information delivery system and transceiver 110, and associated antennas 120, sensor(s) 130, such as an infrared sensor, camera, or in general any sensor, weather pucks 140, stationary equipment 150, such as a de-icing sprayer, road sign, or the like, and a display 160, associated with an information delivery system. The display 160 can be mounted in the cab of a vehicle and can include associated speakers as well as communication capabilities such that cameras, microphones, and in general and device, can be associated with the information delivery system 110. The display 160 includes one or more display portions 165-180 and one or more buttons 185. The exemplary display portions include a map 165, radar 170, road information 175 and truck information 180. Once the driver of the snow plow starts the engine of the vehicle, after a short delay, the information delivery system will start up. This delay (as well as the corresponding delay prior to automatic shutoff) is optionally implemented to conserve and better manage power derived from the vehicle. Once the system has started up, the driver can then enter an identification, and optional password, to the system by means that may include but are not limited to the following: alpha/numeric entry such as through on screen touch input, or through a separate wired or wireless keyboard, fingerprint reader, identification card scanner, voice recognition system, or RFID scanner. The driver profile is important for many different reasons, which may include association of the activities following the identification with the driver, preservation of personal settings in regards to the display and vehicle preferences, grant of access to certain activities or types of information as well as different menu screens with regard to pre-defined permissions, and provision of driver-specific recommendations. Identification can also provide additional security by disabling the vehicle if too many invalid entries are entered.

Once driver identification has been established, the driver may confirm and/or modify vehicle profile information associated with the particular snow plow to reflect specific materials being carried (applicable profiles can be generated manually or at least in part be automated with applicable sensors). Once the driver and vehicle profiles have been established and transmitted by the information delivery system and transceiver 110 to an information management system 100, the data can be aggregated with other relevant information to create several strategies for road maintenance. These strategies will be applied to one or more of additional software, techniques, expert systems and algorithms to determine the most cost-effective and efficient strategy, which will then be combined with other information to deliver a vehicle and location specific recommendation back to the snow plow.

Collecting Data

As discussed in relation to FIGS. 2-5, (with exploded views shown in FIGS. 8-11) the information collected by the system can vary depending on the application. For example, information from vehicle sensors can include such things as vehicle information, 205, such as vehicle speed, vehicle acceleration, engine revolutions-per-minute, engine temperature, engine oil pressure, and fuel level. It may also collect information specific to snow plows, such as level of materials left on the snow plow, equipment functionality, and activity history. Information collected from third party sources 210 may include weather data, for example from the National Weather Service, forecasts, and local and regional radars and related information such as front location, snow depth, wind conditions, as well as current traffic conditions. Information collected from weather stations and weather pods can include current surface and ambient temperatures, humidity, wind speed and direction, wind chill, rain, snow, and fog, and in general any weather condition, trend, forecast or information. Other types of information that can be gathered or otherwise calculated from gathered data include road conditions, physical location, snow plow setting, mixture and amount of material being applied to a selected surface, video images of the vehicle's exterior environment or the vehicles' interior or exterior, and audio of the vehicle's interior. Such information can be displayed and updated manually or on an automated basis.

All equipment that may be necessary for road maintenance can be identified, by means such as barcodes, RFID tags or in general any type of identifier. Such information can be collected automatically by wireless input from the area, or manually such as with a handheld device to scan or otherwise make note of what equipment is onboard or has been left where. For example, a driver could apply RFID tags to maintenance cones used to identify problem areas and caution drivers to avoid the areas. The driver could scan the RFID tags wirelessly from the onboard system or by using a handheld device and then synchronize the data with the information system, which would ultimately transmit both the item identification and relevant GPS coordinates to the remote server and plot the same on applicable internal and/or publicly accessible maps. Such information is likely to aid with general traffic flow and congestion mitigation and with the internal tracking and maintenance of peripheral equipment to reduce careless loss or misplacement.

Sensors aboard the snow plow can be optionally accessed and controlled through or in conjunction with the information delivery system 110 and the information management system 100. This may include, for example, controlling the spreading of materials (amount and type of material) onto the road. Because the relevant vehicle information can be stored in the vehicle and/or on the information management system 100, the information can directly used in conjunction with treatment recommendation software or separately/manually specified by supervisors from other vehicles via their own onboard system, or from an office or other mobile environment via computer, PDA, or cell phone. Once the relevant information is sent back to the snow plow, the application rates can be so set, with or without an option for the driver to accept or reject and override the same. Thus, in-vehicle settings can be automated and/or remotely controlled, allowing the drivers to focus on driving while more or less granular adjustments to treatment materials and application rates can be automated and/or remotely guided by systems and software which are taking into account information, strategies and conditions beyond that known or available to any given driver/operator. This feature can be overridden by the driver if and to the extent allowed, in general or in specific parameters such as where another vehicle is following closely or where ice or drifting snow is directly observed.

In addition to vehicle specific data, maintenance vehicles so equipped may also be used for detailed road profiling, manually and/or through cameras and other equipment, while the vehicle drives down roads. This may include collecting data regarding shaded and windblown areas during various times throughout the year; marking lanes so that very specific information can be recorded and relayed; and other activities such as road repairs, debris clearance, weed spraying, paint stripping, or other maintenance which may need to be performed. Times, locations, and other conditions and information can be recorded with such events to preserve and generate appropriate reports and records, as well as for separate processing and analysis, accounting, materials inventory, purchasing, etc.

Additional features may include updates to the system, updates made by the system to other onboard systems, remote access to instruction and practice manuals and record keeping systems, etc. that can done either on a manual basis or an automated basis.

Information Transmission and Display

Once the information management system 100 recognizes the specific vehicle requesting information, it will generate a vehicle-specific recommendation for actions to take in regards to road maintenance, using the information collected which may include weather conditions, road conditions, vehicle state, and a brief history of actions previously taken in regards to the area. Vehicle characteristics (e.g. liquid/sand capabilities, materials carried, etc.) can be predefined and/or dynamically entered and submitted with each information request, refresh or other communications process (automated or manual).

Figure 2:
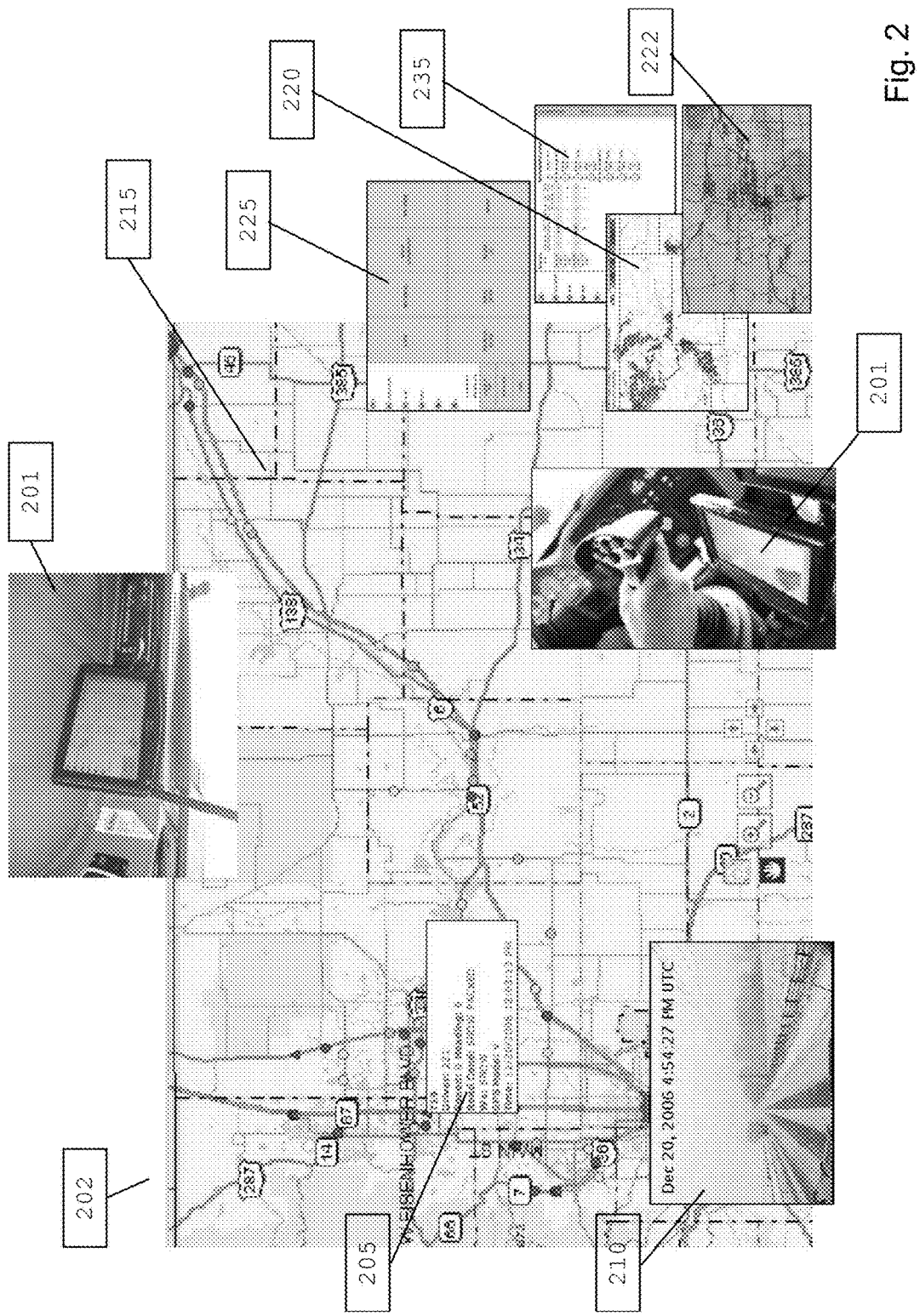
FIG. 2 is an exemplary screenshot of an interface available to one or more of drivers in the road maintenance vehicles and other personnel and the types of information that can be displayed according to this invention.
Figure 3:
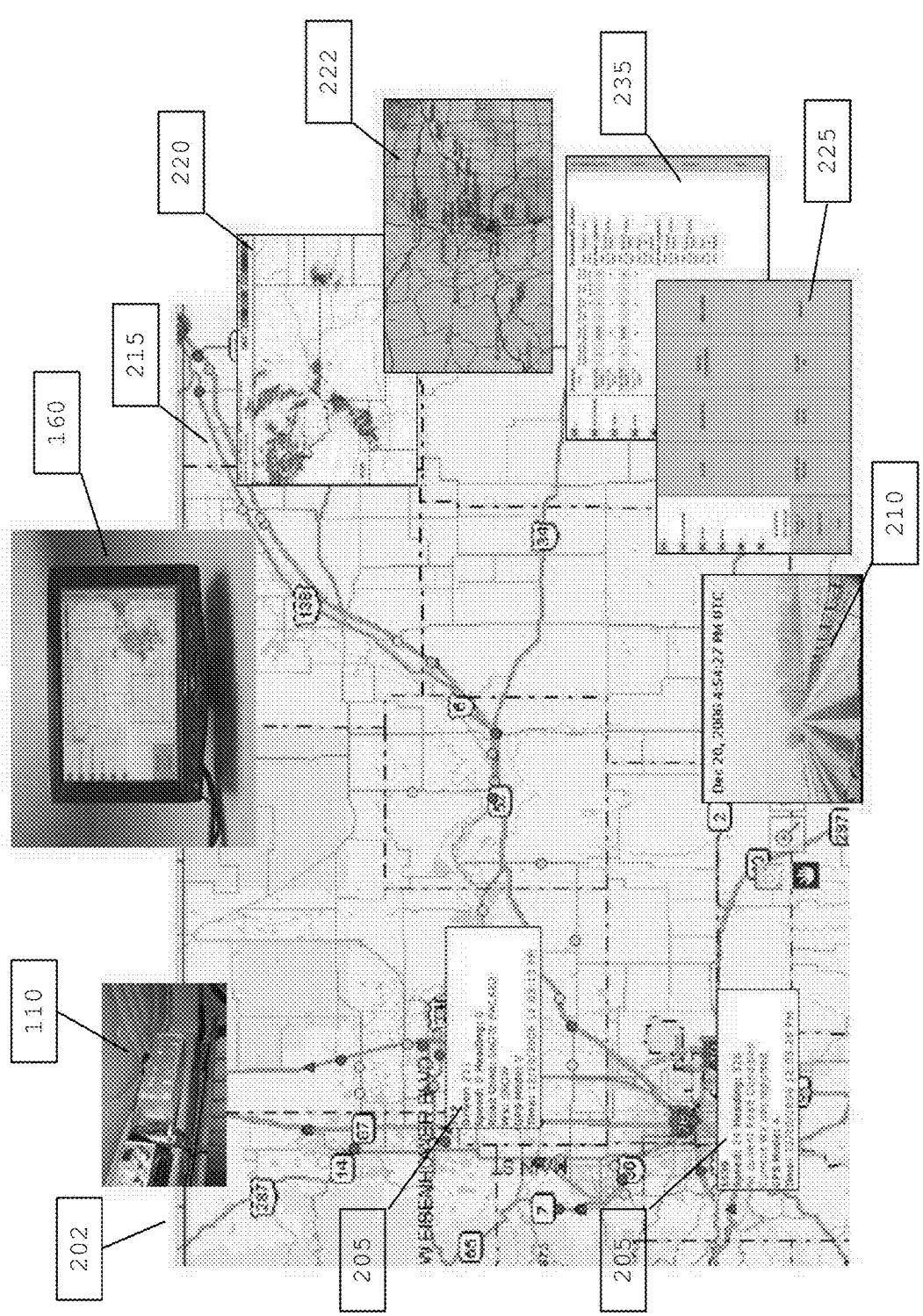
FIG. 3 is an exemplary screenshot of the interface available to display the types of information generated according to this invention.

In one configuration, the data that will be displayed will be generated to a webpage accessible by the vehicle. Examples of generated portions of webpages are shown in FIGS. 2-3 and FIGS. 8-11. In FIG. 2, which illustrates a graphical user interface 202 displayable on a vehicle mounted display 201, truck statistics portion 205 includes information about a specific vehicle, camera portion 210 includes a view from any camera (vehicle mounted or elsewhere), radar and weather portions 220 and 222 include one or more of (Doppler) radar, weather statistical information and weather information, map portion 215 includes map information optionally showing the current location of the vehicle and status of various road conditions with optional color coding.

Onboard cameras and other sensors could also be used to trigger automatic shutdown of vehicle functions. For example, if a car is following too closely to a truck spreading sand or other material, the sand spreading function could be disabled.

Other selectable insets could also be displayed depending on the information desired by a user. Selectable menu 225 (shown in greater detail in FIG. 8) can provide access to the various functionality, including forecast and recommended actions, of the system with display 235 (shown in greater detail in FIG. 9) illustrating some of the data being transmitted by and received from the vehicle.

The selectable menu 225 can have a hierarchical structure and include an exemplary navigation such as:

MAIN MENU
1. LANE
   KEY IN # & ENTER
2. MATERIAL
   a. SALT
      KEY IN # & ENTER
   b. SALT/SAND
      KEY IN # & ENTER
   c. MAG
      KEY IN # & ENTER
   d. MAG/SAND
      KEY IN # & ENTER
   e. ICE SLICER
      KEY IN # & ENTER
   f. COLD MAG
      KEY IN # & ENTER
   g. APEX
      KEY IN # & ENTER
   h. ICE BUSTER
      KEY IN # & ENTER
3. ROAD CONDITIONS
   a. WET
   b. SLUSH
   c. SNOW PACKED
   d. BLACK ICE
   e. FROST
   f. DRY
   g. SNOW
   h. BLOWING SNOW
4. WEATHER
   a. SNOW
   b. BLOWING SNOW
   c. MIX
   d. FREEZING RAIN
   e. RAIN
   f. DRIZZLE
   g. FOG
   h. CLEAR
5. SNOW ON ROAD
   KEY IN # & ENTER
6. TOTAL SNOW
   KEY IN # & ENTER
7. BLADE (up or down) (toggle)
8. RESET (w/ following pop-up to confirm or cancel)
   DO YOU REALLY WANT TO RESET?
   a. YES (will send a demark and blank out screen settings)*
   b. NO (will return to main menu)
   * A demark can be sent when the truck is started and when the reset button is depressed and confirmed. The demark will denote prior data entries are no longer effective, and that no new data should be read or interpreted until menu items are again entered. Data can be deemed dated and no longer used for forecasting when such demark is received and/or when the data is more than xx old. Historic data will be forwarded when in coverage if out. Time stamps will be provided for when the data was recorded as well as when it is entered in the database. A bright/dim toggle is provided to shade screen brightness for night use (eg. std for day, dim for night).

The webpage or interface on the display can also provide a spatial map showing vehicle locations, vehicle operations, and other state information. For example, the map can depict the location the snowplow as well as the other snowplow trucks relative to the initial truck, using an icon denoting each truck. The icon color can be varied to indicate differing vehicle states. Text and/or visual (camera) information can be depicted on the map adjacent to or associated with each icon. The text information can describe selected state information associated with the truck, such as a truck identifier, direction of travel, speed, status of GPS signal, status and activity, and timestamp of last data update for the identified truck. The map can also depict, for one or more selected vehicles, a trace route over a selected period of time. A trace route indicates the path of travel of the vehicle over the selected time period. The map can also display reported conditions and status of the vehicle, activities (such as treatment material, quantities of material used, blading, speeds, time, images, etc.). Such historic information can then be factored into new forecasts, treatment strategies and recommendations as well as directly accessible by maintenance and other personnel, and by the traveling public. Additionally, the display can show the recommendation for the specific vehicle, which the driver may accept or make modifications. Such modifications as well as the actual applications as put forth throughout a route, would then be transmitted back to the information management system 100 and saved as part of the history of actions taken in relevant region and used as a basis for subsequent strategies and recommendation (for example, increased use of given material may lessen the amount recommended on the next pass).

Figure 4:
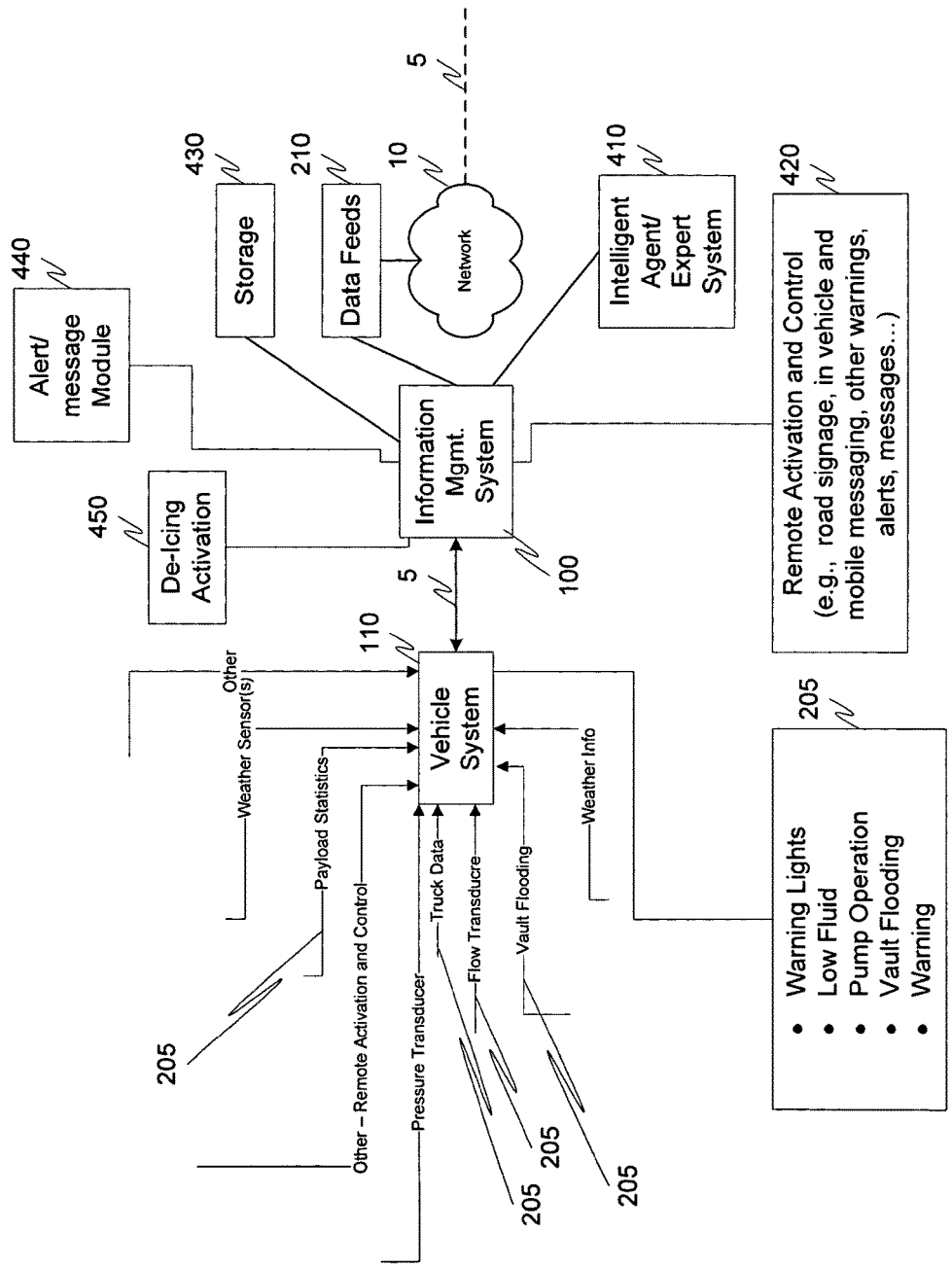
FIG. 4 illustrates a system-level view of data flow in the information management system according to this invention.

In the above embodiments, the information delivery systems 110 commonly include a smart modem device and peripherals thereof, such as a monitor (e.g., a touch screen), external GPS and connection antenna, and wired or wireless connections to internal vehicular components. As shown in FIG. 4, the information delivery system 110 is capable of receiving information from a plurality of sources, and communicating with the information management system 100 via one or more links 5 and networks 10. The information delivery system, or vehicle system, is also capable of providing information 205 to a user, such as a snow plow driver, via the display and/or audible indicators. The information management system 100 is also connected to a remote activation and control module 420, an intelligent agent/expert system 410, one or more data feeds 210, storage 430, an alert/message module 440 and an activation module, such as de-icing activation module 450.

Historic information regarding vehicle activity stored in storage 430 (e.g. specific material used in previous pass, when activity occurred, etc.) is dynamically analyzed and processed by one or more of the information management system 100 and intelligent agent/exert system 410 and to ascertain more accurate recommendations by the information management system 100. For example, if a plow applied de-icing material to the road earlier that day, the subsequent strategies and recommendations would specifically take into consideration such actions and would produce recommendations and strategies that would differ from a vehicle that may have applied a heavier treatment of different or same materials. The information management system can also take into consideration other maintenance functions and vehicle profile and/or status (e.g. whether vehicle is equipped for salt, sand, or magnesium chloride) and adjust the recommendation and applicable strategies accordingly.

The data collected from various sources and the corresponding reports and recommendations sent back to the road maintenance vehicles can be transmitted to the information delivery system (vehicle system) in the vehicle through a variety of methods. These may include both public and private wireless networks as well as land-lines and/or wired networks or via satellite. If commercial wireless carriers, such as Sprint™, Nextel™, and Verizon™, are utilized, the information delivery system has the ability to accommodate and work with different types of IP addresses, including static, dynamic, and spoofed addresses. Dynamic and spoofed IP addresses are typically assigned to mobile devices. However, this system does not require carriers separately to provide dedicated lines and/or fixed IP addresses. The information delivery system and transceiver 110 check for updates from the information management system 100 and download the same when present. These updates can be downloaded as the driver requests or on an automated basis. The system can be used for example to send information to the vehicle or to change programming and/or remotely access the vehicle, even when otherwise protected by dynamic and spoofed IPs. One example of this would involve updates to menu items and/or applications, which can be posted to a central server. The system can then be set to periodically or upon certain conditions check the information management system for updates and if present, download and install the same to itself or other onboard systems and/or run applications. This can be done despite the inability of a central computer to communicate with the vehicles.

The information delivery system is also compatible with 3G and other wireless technologies. 3G technologies are the third-generation technology in the context of mobile-phone standards and are associated with wide-area wireless voice telephony and broadband wireless data.

The data collected and information processed can also be used to produce several different types of web pages and reports. A web page can be created for the driving public to indicate road conditions as well as areas that have been cleared by snow plows, particular icy areas, areas with heavy traffic, and other information. An internal web page could also be created for use by central dispatch to determine where to allocate certain resources and problem areas that may require more attention. Such information can be used to more efficiently deploy vehicles as well as keep an accurate account of activities.

Figure 10:
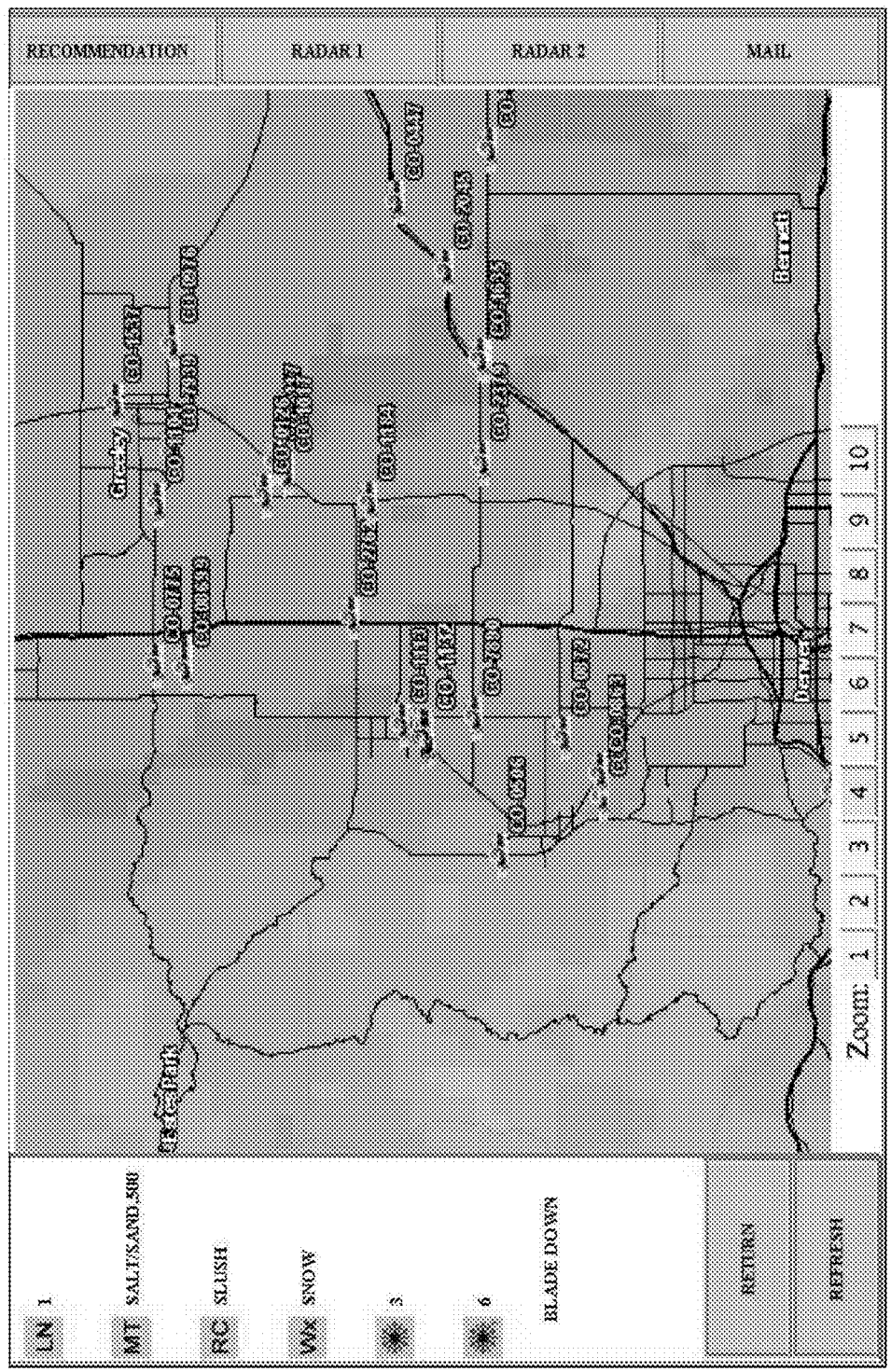
Figure 11:
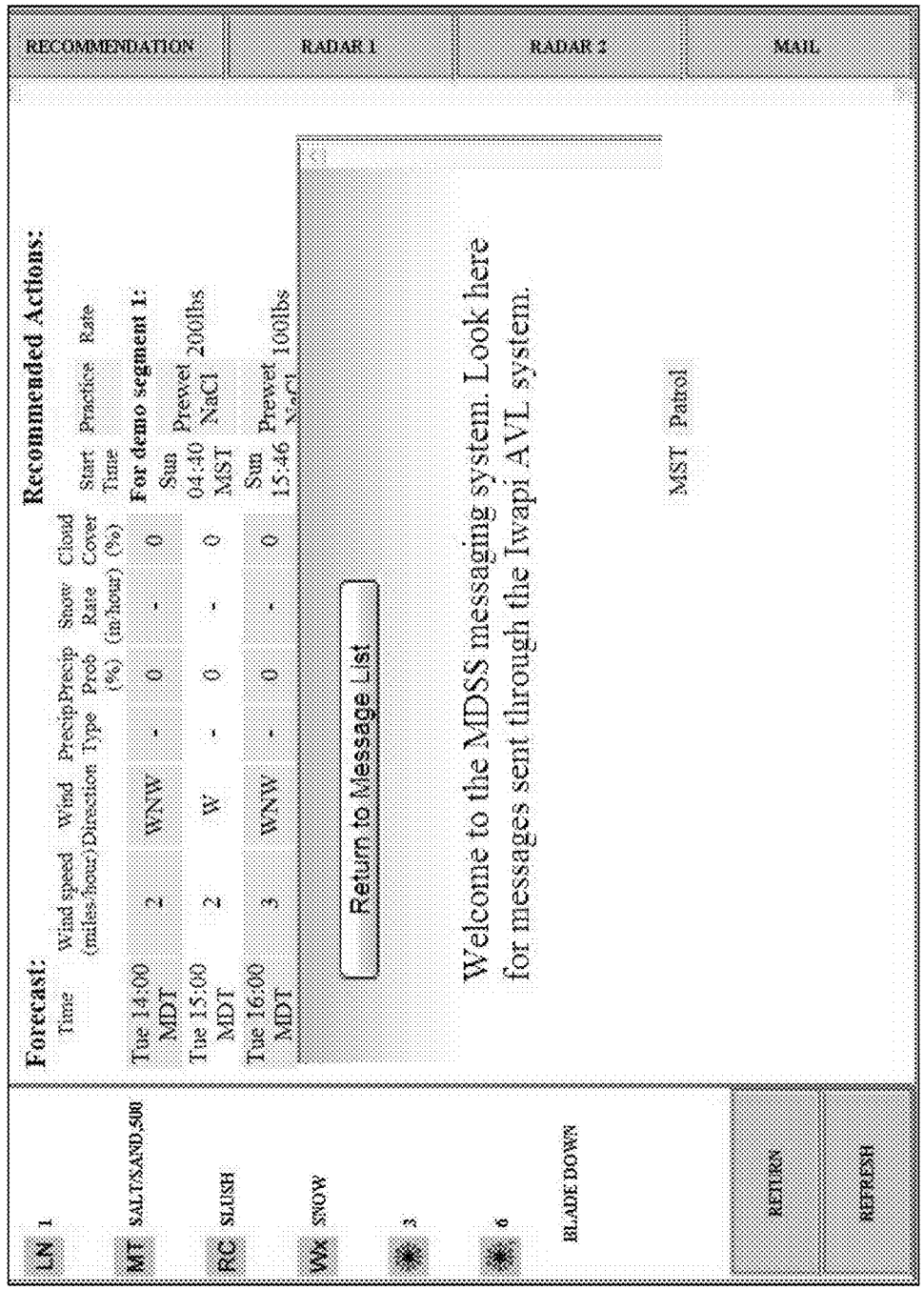

FIG. 10 illustrates an interface showing a truck centered local radar with zoom capabilities and FIG. 11 an exemplary message capable of being received at a vehicle. In FIG. 10, any of the trucks can be selected and information about that vehicle displayed. The interface in FIG. 11 can be used to one or more of sent or receive messages within the system.

Weather Pods

Figure 5:
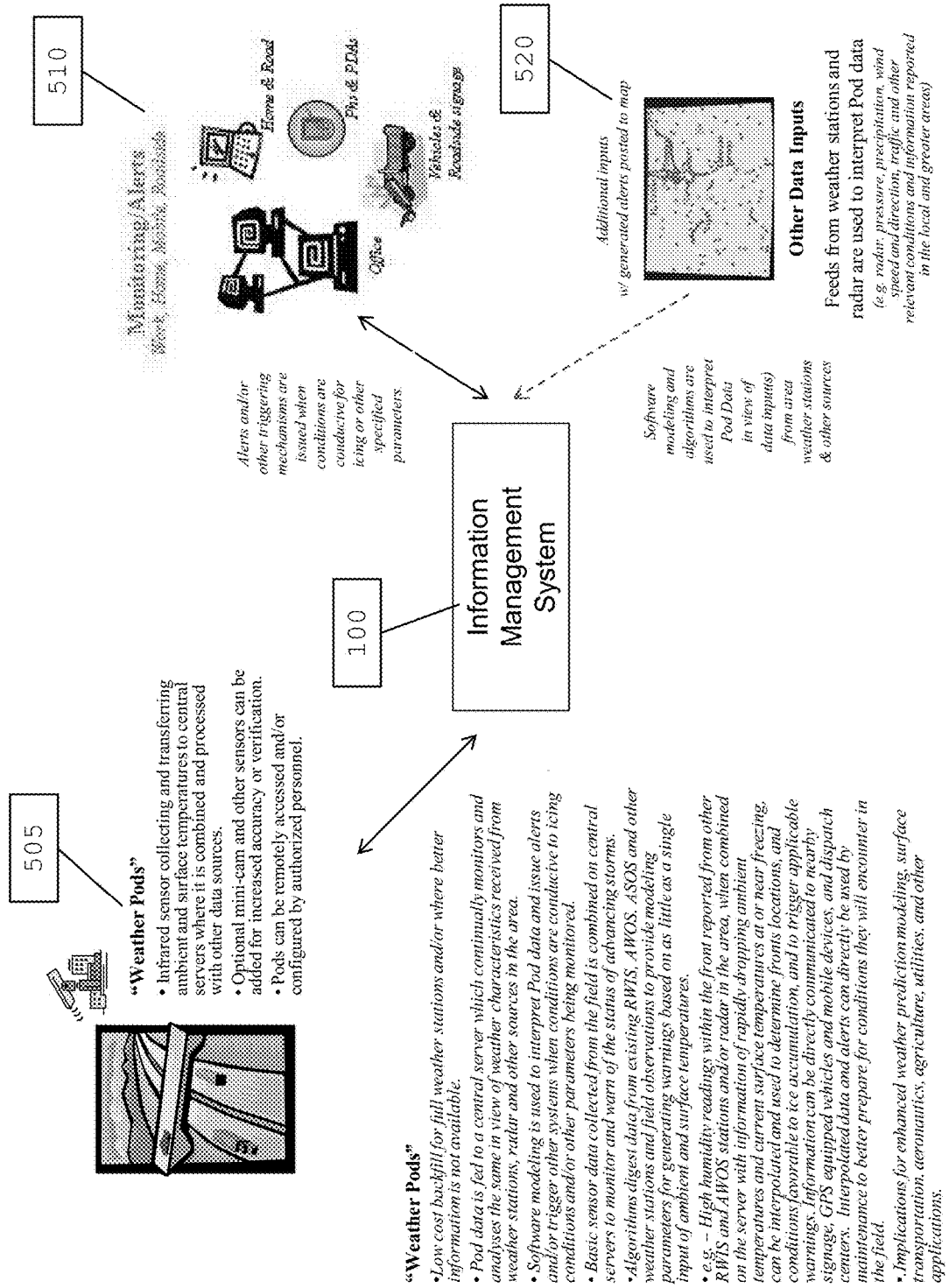
FIG. 5 illustrates a second system-level view of data flow in the information management system according to this invention.

FIG. 5 illustrates the use of weather pods in accordance with an exemplary embodiment. Weather pucks 140 (in FIG. 1) and weather pods 505 are available through the information delivery system for use in areas where there are no full weather stations and installing one would be impractical and cost-prohibitive. The application involves a fixed, instead of a mobile, application of similar technology and processes to provide an inexpensive alternative for regions that currently do not have full weather stations, making accurate data collection possible in areas that have historically been void of such data collection. These devices generally contain an infrared sensor capable of measuring ambient and surface temperatures, and a modem that allows the device to transmit the collected data back to the information management system 100. It is possible to add additional sensors, cameras, and/or other related equipment to the weather pods in order to enhance the accuracy. The data is sent back to the information management system 100 where it is displayed or directly used, or where it is applied to algorithms or modeling software with other known or separately collected weather characteristics to enhance interpretation and generate warnings, monitoring alerts 510, e.g., to one or more of a vehicle, sign, home or office, phone, etc, and information enhanced maps 520.

Sensors which typically would require a 12-Volt DC power source can be powered by the information delivery system and transceiver 110 or a separate 12-Volt power supply or reconfigured to use AC power. These sensors can be mounted on vehicles or can be stationary. They can be mounted in places such as the shoulders of the road, overhead signage, or under bridges or overpasses or in general any location from which information is desired.

Temperatures could be recorded in the field with a corresponding time stamp. The time stamp of the in-field system, as with the in vehicle system used in the plow context above, can be automatically synchronized to UTC. The information could then be transmitted to the information management system 100. If the system were unable to establish a network connection, the data could be stored in the information delivery system and transceiver 110 and transmitted once a connection could be established.

One exemplary purpose of the weather pods is to collect basic information (e.g. ambient and surface temperatures) and transmit the data to the information management system 100 to be processed with other known or collected information to provide a more enhanced and accurate depiction of the different weather conditions at various locations which will ultimately aid to better predict weather conditions and increase ability to effectively plan and prepare, by both the road maintenance vehicles and the public at large.

Road and Bridge De-Icing Application

The Road and Bridge De-Icing application is another example of a stationary embodiment of the information delivery system. As illustrated in FIG. 1, the road and bridge de-icer 150 can be remotely controlled to effect road and bridge de-icing. Data is collected from a myriad of sources that may include data from weather sensors (e.g., current temperatures, wind speed, humidity, precipitation), vehicle sensors (e.g., system liquid levels, engine data, state of snow blade, camera images, vehicle speed, vehicle routes, driver information, etc.), external data sources (e.g., traffic, weather, and other relevant conditions and information). The de-icing application, in cooperation with one or more of the de-icing activation module 450 and remote activation and control module 420, then activates the head sprayers 150 and/or report status back to the information management system 100.

This information can be displayed on web pages that can be viewed by personal computers, PDAs, cell phones, and/or in the road maintenance vehicles. Alerts can also be sent out via email or text messages to the same devices, as well as via a call out for a voice alert via telephone or cell phone, or fax messages. Any of the devices can also be used to manually send a command to the de-icing activation module to trigger the de-icing system 150 if desired. Plow drivers and other authorized personnel can also manually activate the system via a wireless remote, their display and/or via a switch at the vault.

Camera images, e.g., 210, can be requested and/or automatically sent upon specified parameters from the field by attaching a camera to the information delivery system. For example, video boards can used to provide periodic or requested still images from the video stream. Images can be used for remote insight regarding conditions at that location. Images or video could also be used to assist a vehicle with a breakdown.

In general, any of the information obtained by or determined by the system can be sent back for use for internal maintenance decisions and action, and for the traveling public and other systems (e.g. public web sites) through an established network connection to the information management system 100.

The information on the information management system 100 can be shared with other client servers (not shown) and other information management systems 100. Any computer, cell phone or PDA, or road maintenance vehicle(s) with the ability to communicate through an established network, can access this information. Telephone call systems can generate alerts as certain types of information are received. The information can also be directly furnished to other systems at one or more internal departments or third parties. Applications on such other systems can in turn use the information for other purposes.

Data received by the information management system 100 can also be supplemented with data and information from other sources for processing and/or display and reference.

Figure 6:
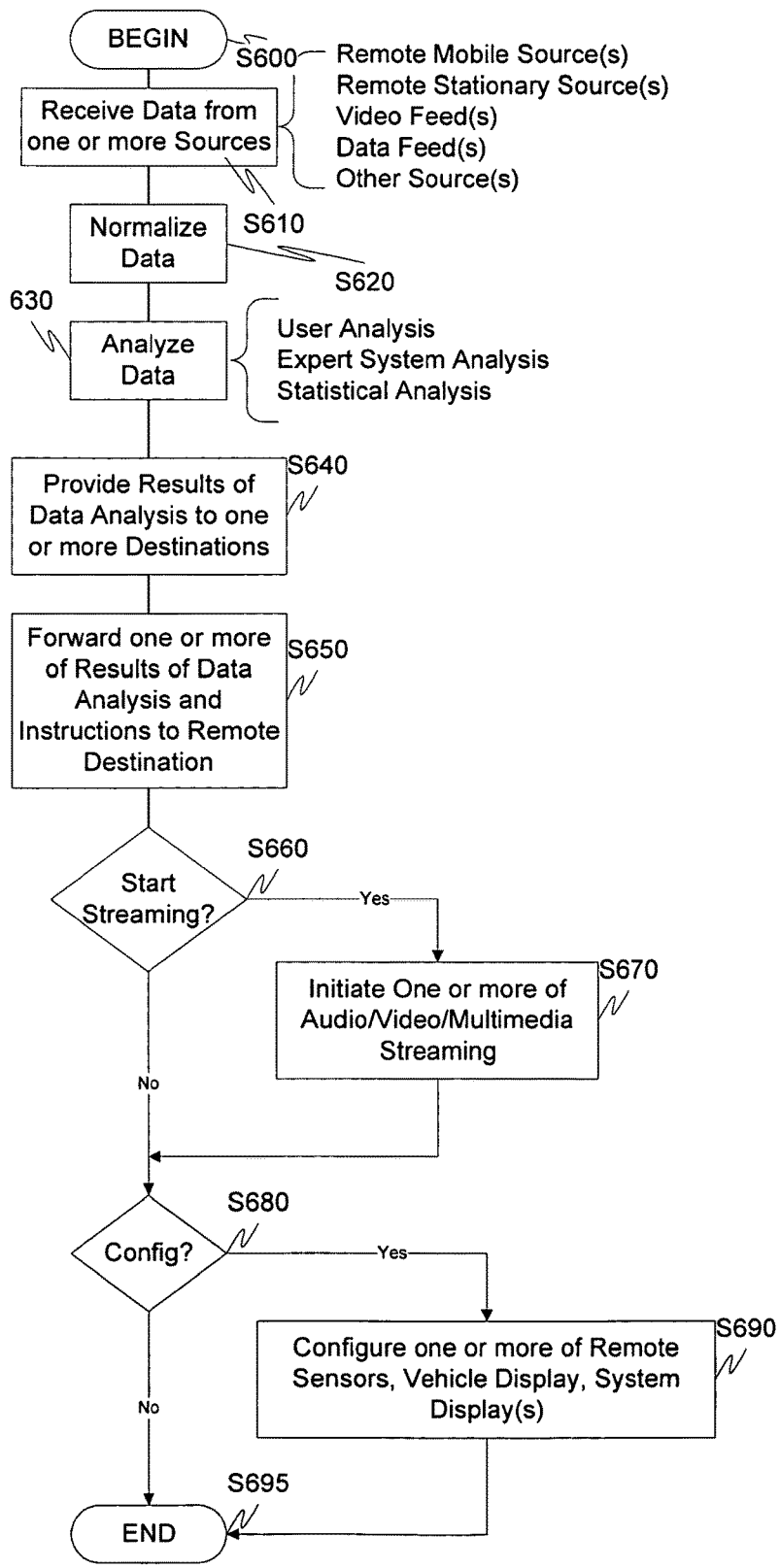
FIG. 6 is a flowchart illustrating an exemplary method of processing and managing data according to this invention.

FIG. 6 illustrates and exemplary flowchart outlining some of the various functionality of the information management system 100 and information delivery system 110. In particular, control begins in step S600 and continues to step S610. In step S610, data is received from one or more sources. As discussed, this data can originate with one or more of a remote mobile source, a remote stationary source, a video feed, a data feed or other data source such as another information management system. Next, in step S620, the data is normalized or synchronized to a common time. Then, in step S630, the data is analyzed by one or more of a user(s), an intelligent agent, an expert system, and by the information management system. Control then continues to step S640.

In step S640, the results of the analysis are provided to one or more destinations. Next in step S650, one or more of the results, instructions and additional data can be forwarded to a remote destination. It should also be appreciated that this information instead of being pushed to the remote destination could also pulled by a remote destination, such as a vehicle, from the information management system automatically or manually. Then, in step S660, a determination is made whether to start streaming of information. If information is to be streamed, control continues to step S670, with control otherwise jumping to step S680.

In step S680, a configuration option is selectable that allows a user to manage and configure one or more of the information management system and information delivery system. If configuration is selected, control continues to step S690 where configuration is allowed with control otherwise continuing to step S695 where the control sequence ends. As with other types of configuration routines, entry thereto can be user-centric and one or more of password and security level regulated.

Figure 7:
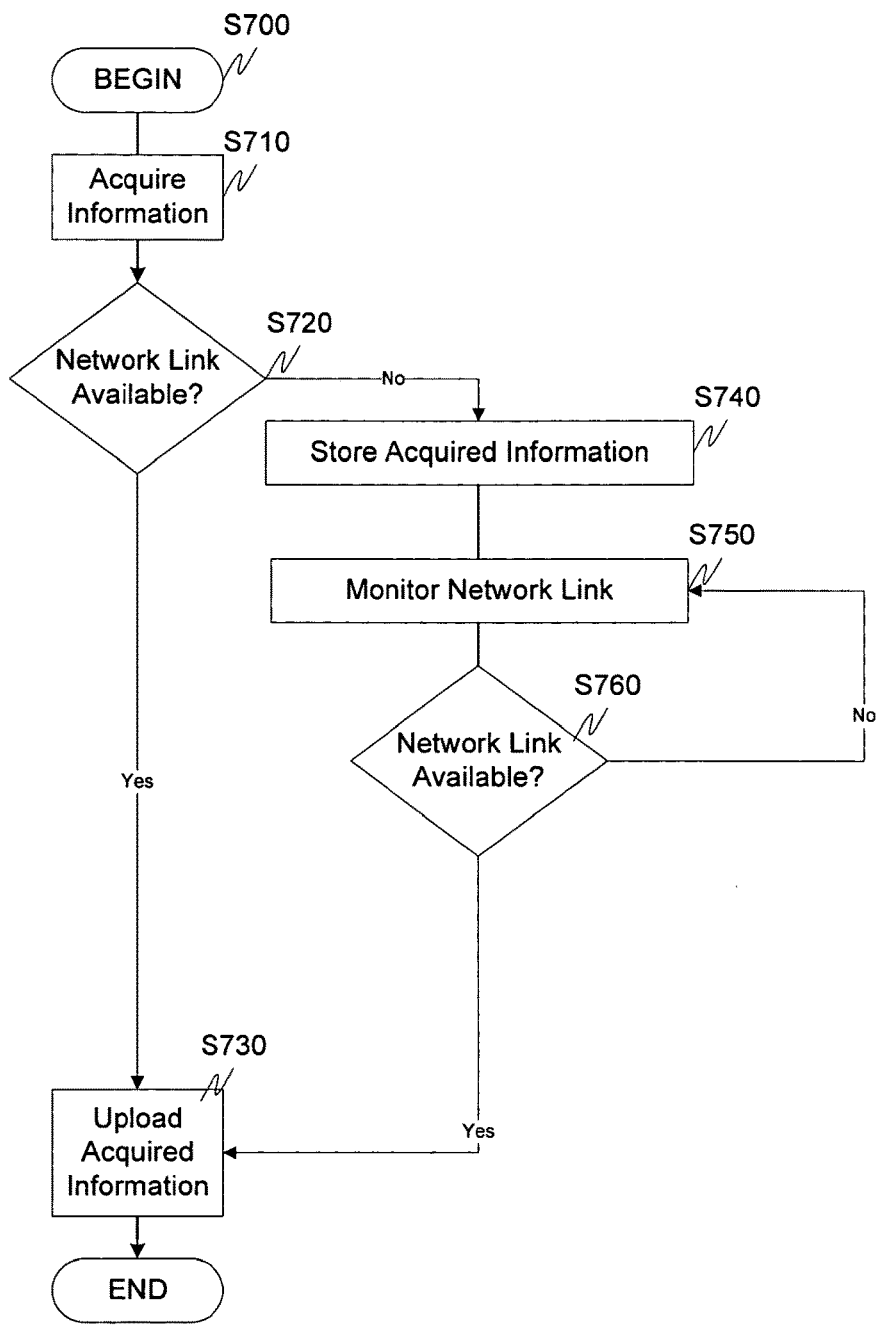
FIG. 7 illustrates an exemplary method of uploading data according to this invention.
Figure 8:
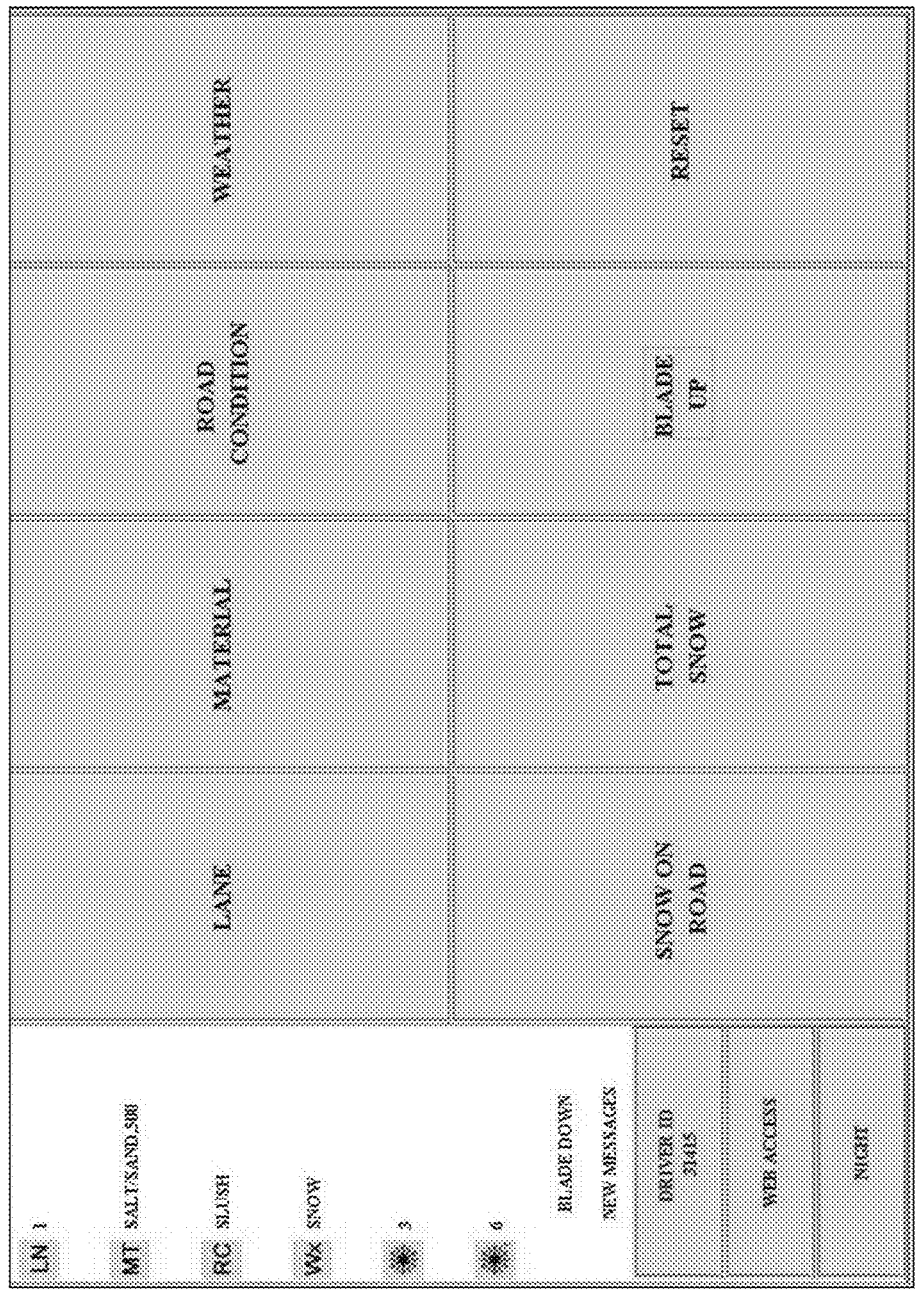

FIG. 7 illustrates an exemplary method of addressing network unavailability by the information delivery system. Control begins in step S700 and continues to step S710. In step S710, information is acquired. This information can be any information acquired by the information delivery system and can include user requests for data. Next, in step S720, a determination is made whether a network link is available. If a network link is available, control continues to step S730 where one or more of the acquired information and user requests for data are uploaded and forwarded to the information management system. If a network link is not available, control jumps to step S740.

In step S740, the acquired information is stored and in step S750 the network link monitored. Then, in step S760, a determination is made whether a network link is available. If a network link is available, control continues to step S730 with control otherwise jumping back to step S750.

It should be appreciated that the various functionalities disclosed herein need not be necessarily associated with the described graphical user interface, but an additional custom graphical user interface could be provided that allows the various functionality to be selected and status updated.

A number of variations and modifications of the invention can be used. It would be possible to provide for some features of the invention without providing others.

The exemplary systems and methods of this invention have been described in relation to information management. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system colocated, certain components of the system can be located remotely, at distant portions of a distributed network 10, such as a LAN, cable network, and/or the Internet, or within a dedicated system. Thus, it should be appreciated, that the components of the system can be combined in to one or more devices, such as an information management system, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in one or more of the information management system and information delivery system. Similarly, one or more functional portions of the system could be distributed between a communications device(s), such as a PDA, and an associated computing device.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A system comprising:
a server adapted to receive information from:
at least one snow maintenance vehicle-based system, located in a snow maintenance vehicle, adapted to forward to the server at least one of road and/or weather conditions from an area proximate to the snow maintenance vehicle;
at least one stationary system adapted to forward to the server at least one of road and/or weather conditions from an area proximate to the stationary system;
and wherein said server is further adapted to determine snow maintenance instructions to send to a user of the snow-maintenance vehicle; and
wherein the road and/or weather conditions forwarded to the server by the stationary system are used to refine the snow maintenance instructions sent to the user of the snow maintenance vehicle.

2. The system of claim 1, wherein the server receives the information over a cellular network.

3. The system of claim 1, wherein the server receives the information over a radio network.

4. The system of claim 1, wherein the server sends the snow maintenance instructions directly to the user of the snow maintenance vehicle.

5. The system of claim 1, wherein the snow maintenance vehicle-based system sends at least one of road and/or weather conditions to the server over a first communications link and receives snow maintenance instructions from the server over a second communications link.

6. The system of claim 1, wherein the snow maintenance instructions are first provided to a supervisor and the supervisor relays the snow maintenance instructions to the user in the snow maintenance vehicle.

7. The system of claim 6, wherein the snow maintenance instructions are provided to the supervisor at a non-portable computer terminal.

8. The system of claim 6, wherein the snow maintenance instructions are provided to the supervisor at a portable computer via a wireless signal.

9. The system of claim 6, wherein the supervisor sends the snow maintenance instructions to the user in the snow maintenance vehicle orally via a radio signal.

10. The system of claim 1, wherein the snow maintenance instructions determined for a selected snow maintenance vehicle are sent to users in a plurality of additional snow maintenance vehicles.

11. A method comprising:
receiving information at a server from:
at least one snow maintenance vehicle-based system, located in a snow maintenance vehicle, adapted to forward to the server at least one of road and/or weather conditions from an area proximate to the snow maintenance vehicle;
at least one stationary system adapted to forward to the server at least one of road and/or weather conditions from an area proximate to the stationary system;
determining, by the server, snow maintenance instructions to send to a user of the snow-maintenance vehicle;
sending the snow maintenance instructions to the user of a snow maintenance vehicle; and
wherein the road and/or weather conditions forwarded to the server by the stationary system are used to refine the snow maintenance instructions sent to the user of the snow maintenance vehicle.

12. The method of claim 11, wherein the server receives the information over a cellular network.

13. The method of claim 11, wherein the server receives the information over a radio network.

14. The method of claim 11, wherein the server sends the snow maintenance instructions directly to the user of the snow maintenance vehicle.

15. The method of claim 11, wherein the snow maintenance vehicle-based system sends at least one of road and/or weather conditions to the server over a first communications link and receives snow maintenance instructions from the server over a second communications link.

16. The method of claim 11, wherein the snow maintenance instructions are first provided to a supervisor and the supervisor relays the snow maintenance instructions to the user in the snow maintenance vehicle.

17. The method of claim 16, wherein the snow maintenance instructions are provided to the supervisor at a non-portable computer terminal.

18. The method of claim 16, wherein the snow maintenance instructions are provided to the supervisor at a portable computer via a wireless signal.

19. The method of claim 16, wherein the supervisory sends the snow maintenance instructions to the user in the snow maintenance vehicle orally via a radio signal.

20. The method of claim 11, wherein the snow maintenance instructions determined for a selected snow maintenance vehicle are sent to users in a plurality of additional snow maintenance vehicles.

* * * * *